United States Patent
Marumoto et al.

(10) Patent No.: US 9,605,662 B2
(45) Date of Patent: Mar. 28, 2017

(54) SOLAR HEAT BOILER AND SOLAR HEAT ELECTRIC POWER GENERATION PLANT

(75) Inventors: Takahiro Marumoto, Kure (JP); Tetsuo Sikata, Tokyo (JP); Kenso Arita, Kure (JP); Jun Kashima, Kure (JP)

(73) Assignee: Mitsubishi Hitachi Power Systems, Ltd., Yokohama-shi (JP)

( * ) Notice: Subject to any disclaimer, the term of this patent is extended or adjusted under 35 U.S.C. 154(b) by 415 days.

(21) Appl. No.: 14/129,672

(22) PCT Filed: Jun. 18, 2012

(86) PCT No.: PCT/JP2012/065497
§ 371 (c)(1),
(2), (4) Date: Dec. 27, 2013

(87) PCT Pub. No.: WO2013/002054
PCT Pub. Date: Jan. 3, 2013

(65) Prior Publication Data
US 2014/0138952 A1    May 22, 2014

(30) Foreign Application Priority Data
Jun. 30, 2011    (JP) .................................. 2011-146387

(51) Int. Cl.
*F03G 6/06*     (2006.01)
*F24J 2/04*     (2006.01)
(Continued)

(52) U.S. Cl.
CPC ............ *F03G 6/065* (2013.01); *F03G 6/067* (2013.01); *F22B 1/006* (2013.01); *F24J 2/0483* (2013.01);
(Continued)

(58) Field of Classification Search
CPC .. F03G 6/06; F03G 6/065; F22B 1/006; F22B 1/08
See application file for complete search history.

(56) References Cited

U.S. PATENT DOCUMENTS 4,050,418 A * 9/1977 Watanabe ............. F22B 35/004
122/32
4,214,450 A * 7/1980 Nagashima ........... F01K 23/106
60/39.182

(Continued)

FOREIGN PATENT DOCUMENTS

AU    2012261714 A1    1/2013
CN    101126503 A    2/2008
(Continued)

OTHER PUBLICATIONS

DE 102007013430 A1 English Translation.*
(Continued)

*Primary Examiner* — Thomas Denion
*Assistant Examiner* — Jessica Kebea
(74) *Attorney, Agent, or Firm* — Crowell & Moring LLP

(57) ABSTRACT

A solar heat boiler is provided which is capable of avoiding damage to heat transfer tubes without increasing facility cost and construction cost. The solar heat boiler includes: a low-temperature heating device by which water supplied from a water supply pump is heated by heat of sunlight; a steam-water separation device by which two-phase fluid of water and steam generated in the low-temperature heating device is separated into water and steam; a high-temperature heating device by which the steam separated by the steam-water separation device is heated by the heat of sunlight; and a circulation pump by which the water separated by the steam-water separation device is supplied to the low-temperature heating device.

13 Claims, 18 Drawing Sheets

(51) Int. Cl.
*F24J 2/07* (2006.01)
*F24J 2/14* (2006.01)
*F24J 2/10* (2006.01)
*F22B 1/00* (2006.01)
*H02K 7/18* (2006.01)

(52) U.S. Cl.
CPC ............. *F24J 2/07* (2013.01); *F24J 2/1047* (2013.01); *F24J 2/14* (2013.01); *H02K 7/1823* (2013.01); *F24J 2002/1023* (2013.01); *Y02E 10/41* (2013.01); *Y02E 10/45* (2013.01); *Y02E 10/46* (2013.01)

(56) References Cited

U.S. PATENT DOCUMENTS

| | | | |
|---|---|---|---|
| 4,400,946 A * | 8/1983 | Oplatka | F03G 6/065 60/641.8 |
| 6,705,311 B1 * | 3/2004 | Schwartzman | F24J 2/055 126/652 |
| 7,296,380 B2 | 11/2007 | Bäckman | |
| 8,087,245 B2 | 1/2012 | Quero et al. | |
| 8,671,932 B2 * | 3/2014 | Eck | F22B 1/006 126/569 |
| 2005/0126170 A1 | 6/2005 | Litwin | |
| 2007/0073008 A1 | 3/2007 | Hurley et al. | |
| 2008/0092551 A1 * | 4/2008 | Skowronski | F01K 23/10 60/783 |
| 2008/0184789 A1 * | 8/2008 | Eck | F03G 6/065 73/204.16 |
| 2009/0105689 A1 | 4/2009 | Mitchum | |
| 2009/0129166 A1 | 5/2009 | Maayan et al. | |
| 2009/0260622 A1 * | 10/2009 | Palkes | F01K 3/186 126/610 |
| 2009/0261591 A1 | 10/2009 | Palkes et al. | |
| 2010/0024421 A1 | 2/2010 | Litwin et al. | |
| 2010/0048578 A1 | 2/2010 | Jachmann et al. | |
| 2010/0126433 A1 | 5/2010 | Kozaki | |
| 2012/0144831 A1 * | 6/2012 | Feldhoff | F22B 1/006 60/641.8 |
| 2012/0186251 A1 * | 7/2012 | Epstein | F03G 6/065 60/641.11 |
| 2014/0060519 A1 * | 3/2014 | Bent | F01K 7/22 126/714 |

FOREIGN PATENT DOCUMENTS

| | | | | |
|---|---|---|---|---|
| CN | 201096060 Y | | 8/2008 | |
| CN | 101354191 A | | 1/2009 | |
| CN | 101539123 A | | 9/2009 | |
| CN | 102007292 A | | 4/2011 | |
| CN | 102046969 A | | 5/2011 | |
| DE | 10128562 C1 | * | 1/2003 | ............... F01K 7/22 |
| DE | 102007013430 A1 | * | 9/2008 | ............ F03G 6/065 |
| EP | 1 930 587 A2 | | 6/2008 | |
| JP | 51-27649 A | | 3/1976 | |
| JP | 57-112647 A | | 7/1982 | |
| JP | 57-146067 A | | 9/1982 | |
| JP | 60-256797 A | | 12/1985 | |
| JP | 61-38111 A | | 2/1986 | |
| JP | 4-219470 A | | 8/1992 | |
| JP | 08283726 A | * | 10/1996 | |
| JP | 9-256811 A | | 9/1997 | |
| JP | 2009-103421 A | | 5/2009 | |
| JP | 2010-121916 A | | 6/2010 | |
| JP | 2011-7149 A | | 1/2011 | |
| JP | 2011-17449 A | | 1/2011 | |
| WO | WO 2009/129166 A2 | | 10/2009 | |
| WO | WO 2010/048578 A1 | | 4/2010 | |

OTHER PUBLICATIONS

Solar Thermal Power Plants with Parabolic-Trough Collectors—Zarza et al Jul. 2004.*
Japanese Office Action dated May 20, 2014 (three (3) pages).
International Search Report dated Aug. 14, 2012 with English translation (five (5) pages).
Japanese-language International Preliminary Report on Patentability (PCT/IB/416) and (PCT/IB/409) dated Oct. 8, 2013 (five (5) pages).
Chinese-language Office Action dated Jun. 30, 2015 (Eight (8) pages).

* cited by examiner

SOLAR HEAT BOILER AND SOLAR HEAT ELECTRIC POWER GENERATION PLANT

TECHNICAL FIELD

The present invention relates to a solar heat boiler for collecting heat from the sun and generating steam using the heat, and a solar heat electric power generation plant using the solar heat boiler. Particularly, it relates to a solar heat boiler which is inexpensive and capable of preventing thermal damage to a heat transfer tube, and a solar heat electric power generating plant using the solar heat boiler.

BACKGROUND ART

In some sites, the amount of collected heat in a solar heat boiler inevitably repeats sudden increase and decrease in accordance with the amount of solar radiation varying suddenly in a short time due to the sunlight blocked by cloud or the like.

On the other hand, solar heat boilers are often introduced into a region called the Sunbelt, that is, a region where annual Direct Normal Irradiance (DNI) is beyond 2,000 $kWh/m^2$, in order to obtain as large the annular total amount of collected heat as possible.

It is usually sunny in the Sunbelt throughout the year, and the amount of solar radiation hardly changes suddenly due to the change in weather. Thus, the stable amount of collected heat over time prevents the aforementioned problem from coming to the surface.

In regions other than the Sunbelt, for example, in Japan, however, the amount of solar radiation frequently changes suddenly in a day due to the change in weather or the movement of clouds so that sudden increase or decrease in the amount of collected heat may appear repeatedly. It is therefore important to take measures against such a problem.

Concentrating solar power generation plants are roughly classified into stand-alone type electric power generation plants and integrated type electric power generation plants. In the stand-alone type electric power generation plants, heat may be secured mostly by solar heat and partially backed up with fossil fuel etc. On the other hand, in the integrated type electric power generation plants, heat is secured mostly by fossil fuel or nuclear fuel and partially backed up with solar heat.

In each type of the stand-alone type electric power generation plants and the integrated type electric power generation plants, heat from the sunlight is collected and used as a heating source, and both the types may use substantially common solar collectors.

Solar collectors used typically include trough type ones, Fresnel type ones, tower type ones, etc. In a trough type solar collector, a heat transfer tube is disposed above an inner circumferential curved surface of a reflecting mirror extending like a trough so that the sunlight can be collected in the heat transfer tube by the mirror. Thus, water circulating in the heat transfer tube is heated to generate steam. In a Fresnel type solar collector, a several number of reflecting mirrors having flat surfaces or slightly curved surfaces are arranged side by side at angles differing bit by bit from one to another, and a several number of heat transfer tubes are disposed above the group of the reflecting so that the sunlight can be collected in the heat transfer tube by the group of the reflecting to generate steam. In a tower type solar collector, a heat transfer tube panel is disposed on a tower having a predetermined height and a large number of reflecting mirrors (heliostats) are disposed on the ground surface so that the sunlight can be collected in the heat transfer tube panel by the group of the reflecting mirrors (heliostats) to generate steam.

Among them, in the trough type and the Fresnel type, the focal length is so short that the concentration ratio of the sunlight (the heat density in a heat collecting portion) is low. On the other hand, the tower type has an advantage that the focal length is so long that the concentration ratio of the sunlight (the heat density in a heat collecting portion) is high.

High heat density in a heat collecting portion leads to increase in the amount of collected heat per unit heat transfer area, so that higher-temperature steam can be obtained. However, when the heat density is simply increased to make a phase change from a water state to superheated steam, there arises a problem that a high-temperature area is formed locally to thereby cause damage to transfer tubes or the like.

In a thermal power generation boiler or the like, the amount of fuel is managed properly to avoid such damage to any heat transfer tube. In the case of solar heat, however, the heat input amount fluctuates so largely that it is difficult to avoid thermal damage to the heat transfer tubes.

To solve such a problem in the tower type with high heat density, a solar heat boiler configured as shown in FIG. 17 and FIG. 18 has been proposed, for example, in Patent Literature 1, Patent Literature 2, etc.

FIG. 17 is a schematic configuration diagram of a solar heat boiler. FIG. 18 is an enlarged schematic configuration diagram of a heat collecting device for use in the solar heat boiler.

In FIGS. 17 and 18, the reference numeral 1 represents a heat collecting device; 2, an evaporator; 3, a superheater; 4, a steam-water separation device; 5, a tower; 6, a heliostat; 7, the sun; 8, a steam turbine; 9, an electric power generator; and 11, a water supply pump.

As shown in FIG. 18, the heat collecting device 1 is functionally divided into the evaporator 2 and the superheater 3, and the steam-water separation device 4 is placed between the evaporator 2 and the superheater 3. The heat collecting device 1 is placed on the tower 5 which is about 30 to 100 meters high. Light from the sun 7 is reflected by the heliostats 6 placed on the ground, and condensed on the heat collecting device 1 so as to heat the evaporator 2 and the superheater 3. Superheated steam generated in the heat collecting device 1 is sent to the steam turbine 8 so as to rotate the electric power generator 9. Electric power is generated in such a mechanism.

Further, FIG. 19 is a schematic configuration diagram of a solar heat electric power generation system described in U.S. Pat. No. 7,296,410 (Patent Literature 3). In FIG. 19, the reference numeral 200 represents a solar heat electric power generation system; 201, a fluid channel; 202, a valve; 203, a pump; 204, a trough device; 205, a heat collection tube; 206, a solar heat collector; 207, a tower; 208, a low-temperature heat storage tank; 209, an intermediate heat storage tank; 210, a high-temperature heat storage tank; 211, a high-output generation device; 212, a turbine; and 213, an electric power generator.

In the solar heat electric power generation system, a thermal fluid stored in the low-temperature heat storage tank 208 is supplied to the trough devices 204 by the pump 203, and heated by heat derived from the condensed light of the sun 106. The thermal fluid further heated in the tower 207 is then sent to the high-temperature heat storage tank 210. The thermal fluid sent to the high-temperature heat storage tank 210 is sent to the high-output generation device 211 by the pump 203. The thermal fluid whose temperature has decreased due to heat exchange is returned to the low-temperature heat storage tank 208.

On the other hand, configuration is made in such a manner that steam generated by the high-output generation device 211 is sent to the turbine 212 so that electric power is generated by the electric power generator 213.

Further, FIG. 20 is a schematic configuration diagram of a solar heat/light collection plant described in U.S. Pat. No. 8,087,245 (Patent Literature 4). In FIG. 20, the reference numeral 301 represents a trough type collector; 302, a tower with heliostats; 303, a low-temperature heat storage; 304, a high-temperature heat storage; 305, an auxiliary device using fossil fuel; 306, a turbine; 307, an electric power generator; 308, a condenser; and 309, a pump.

In the solar heat/light collection plant, water is sent to the trough type collector 301 by the pump 309 and heated by the heat of the sun so as to generate saturated steam. The generated saturated steam is sent to the tower with heliostats 302. The turbine 306 is driven by the superheated steam generated thus, so as to generate electric power in the electric power generator 307.

The steam is returned to water in the condenser 308, and the water is supplied again by the pump 309. Further, the configuration includes a line in which the saturated steam from the trough type collector 301 is not circulated in the tower with heliostats 302 but is passed through the auxiliary device 305 using fossil fuel so as to generate superheated steam.

CITATION LIST

Patent Literature

Patent Literature 1: WO 2009/129166A2
Patent Literature 2: WO 2010/048578A1
Patent Literature 3: U.S. Pat. No. 7,296,410
Patent Literature 4: U.S. Pat. No. 8,087,245

SUMMARY OF INVENTION

Technical Problem

In the aforementioned background-art technique shown in FIGS. 17 and 18, it is, however, necessary to place not only the evaporator 2 and the superheater 3 but also the steam-water separation device 4 in an upper portion of the tower 5 which is 30 to 100 meters high. It is therefore necessary to build the tower 5 strong enough to withstand earthquakes etc. and to support not only the loads of the evaporator 2 and the superheater 3 which are assemblies of a large number of heat transfer tubes but also the load of the steam-water separation device 4 which holds saturated water internally. Therefore, there is a problem that the facility cost and the construction cost increase.

In addition, water must be pumped up to the steam-water separation device 4 at a high site by the water supply pump 11. Therefore, the water supply pump 11 must be high in pumping-up capacity and expensive. Therefore, the facility cost and the running cost increase.

Further, the amount of collected heat in the heat collecting device 1 must be suppressed in order to avoid thermal damage to the heat transfer tubes constituting the evaporator 2 and the superheater 3. Thus, there is another problem that the volume and temperature of steam supplied to the steam turbine 8 fluctuate, with the result that the amount of power generation is not constant.

In the background-art technique shown in FIG. 19, the high-output generation device 211 is required for heat exchange between the thermal fluid and the water-steam. Further, the low-temperature heat storage tank 208, the intermediate heat storage tank 209 and the high-temperature heat storage tank 210, etc. are required for suppressing the temperature change caused by the fluctuation of the solar radiation to thereby stabilize the output of the electric power generator 307. Thus, there is a problem that the facility cost increases and the installation space increases.

On the other hand, in the background-art technique shown in FIG. 20, horizontal heat collecting tubes are placed in the trough type collector 301. Therefore, the fluctuation of the solar radiation leads to a change in the fluid state of a two-phase flow of steam and water in the horizontal heat collecting tubes. Thus, the bottom portion of each tube is filled with water and the top portion of the tube is filled with steam. In the trough type collector 301 which is heated on one side, the temperature on the side (upper portion) where steam exists increases extraordinarily. It is therefore likely that the heat collecting tubes may be damaged.

Further, the auxiliary device 305 using fossil fuel must be placed for supporting the fluctuation of the solar radiation. There is a problem that the facility cost and the running cost increase thus.

To solve such disadvantages belonging to the background-art techniques, an object of the present invention is to provide a solar heat boiler capable of avoiding thermal damage to a heat transfer tube without increasing facility cost and construction cost, and capable of suppressing fluctuation in the amount of power generation in a steam turbine to thereby supply high-quality electricity, and an independent type or composite type solar heat electric power generation plant using the solar heat boiler.

Solution to Problem

In order to attain the foregoing object, according to a first configuration of the present invention, there is provided a solar heat boiler, including:

a low-temperature heating device including a heat transfer tube which is disposed horizontally so that water supplied from a water supply pump can circulate through the heat transfer tube, and a reflecting mirror which collects sunlight in the heat transfer tube, so that the low-temperature heating device can heat the water by heat of the sunlight;

a steam-water separation device by which two-phase fluid of water and steam generated in the low-temperature heating device is separated into water and steam;

a high-temperature heating device by which the steam separated by the steam-water separation device is superheated by heat of sunlight; and a circulating pump by which the water separated by the steam-water separation device is supplied to the low-temperature heating device.

According to a second configuration of the invention, there is provided a solar heat boiler according to the first configuration, wherein:

the low-temperature heating device, the steam-water separation device and the circulating pump are placed on or near a ground surface, and the high-temperature heating device is placed in a higher site than the low-temperature heating device and the steam-water separation device; and a water level gauge which measures a water level in the steam-water separation device, a water supply valve which adjusts a flow rate of water supplied to the low-temperature heating device, and a circulation flow rate control valve which adjusts the amount of water circulating between the low-temperature heating device and the steam-water separation device are provided so that the flow rate of the supplied water or the amount of the circulating water can be adjusted by the water supply valve or the circulation flow rate control valve with the water level in the steam-water separation device being set at a predetermined value.

According to a third configuration of the invention, there is provided a solar heat boiler according to the first or second configuration, wherein:

the low-temperature heating device includes a trough type 1 solar collector in which a heat transfer tube is disposed above an inner circumferential curved surface of a reflecting mirror extending like a trough so that the sunlight can be collected in the heat transfer tube by the reflecting mirror to heat water circulating through the heat transfer tube and generate steam, or a Fresnel type solar collector in which a several number of reflecting mirrors having substantially flat surfaces are arranged side by side and a heat transfer tube is disposed above the group of the reflecting mirrors so that the sunlight can be collected in the heat transfer tube by the group of the reflecting mirrors to heat water circulating through the heat transfer tube and generate steam; and the high-temperature heating device includes a tower type solar collector in which a heat transfer tube panel is placed on a tower having a predetermined height and a large number of reflecting mirrors are disposed so that the sunlight can be collected in the heat transfer tube panel by the group of the reflecting mirrors to superheat steam circulating through the heat transfer tube panel.

According to a fourth configuration of the invention, there is provided a solar heat boiler according to any one of the first to third configurations, wherein:

a glass tube with a predetermined length is disposed on the periphery of the heat transfer tube with a predetermined length so as to form a double structure, and an airtight state or a vacuum state is kept between the heat transfer tube and the glass tube;

the heat transfer tube with the predetermined length is formed by a plurality of heat transfer tubes joined to each other by welding, and the glass tube with the predetermined length is formed by a plurality of glass tubes joined to each other through metal joint tubes which are disposed in joint portions between the glass tubes and which are welded with the glass tubes respectively; and outlet fluid temperature in the low-temperature heating device is regulated to 300° C. or less.

According to a fifth configuration of the invention, there is provided a solar heat boiler according to the fourth configuration, wherein:

a thermometer and a flowmeter are placed in an outlet of the low-temperature heating device and a flow rate of water supplied to the low-temperature heating device is adjusted so that a temperature measured by the thermometer and a flow rate measured by the flowmeter can be set at predetermined values.

According to a sixth configuration of the invention, there is provided a solar heat boiler according to the fourth configuration, wherein:

a thermometer and a flowmeter are placed in an outlet of the low-temperature heating device and the amount of collected heat in the low-temperature heating device is adjusted so that a temperature measured by the thermometer and a flow rate measured by the flowmeter can be set at predetermined values.

According to a seventh configuration of the invention, there is a provided a solar heat boiler according to any one of the first to third configurations, wherein:

a thermometer and a flowmeter are placed in an outlet of the low-temperature heating device and the amount of collected heat in the high-temperature heating device is adjusted in accordance with a value of a temperature measured by the thermometer and a value of a flow rate measured by the flowmeter.

According to an eighth configuration of the invention, there is provided a solar heat boiler, including:

a solar collector including a thermal channel in which a thermal such as diphenyl, biphenyl, 1,1-diphenylethane, etc. circulates, a thermal fluid circulating pump which is provided in the middle of the thermal fluid channel, a heat transfer tube which is provided in the middle of the thermal fluid channel and which is disposed horizontally so that the thermal fluid can circulate through the heat transfer tube, and a reflecting mirror which collects sunlight in the heat transfer tube, so that heat generated by collection of the sunlight can be transferred to the thermal fluid circulating through the heat transfer tube;

a heat exchanger-including low-temperature heating device in which a part of the thermal fluid channel of the solar collector is placed internally as a heat exchanger;

a water supply pump which supplies water to the heat exchanger-including low-temperature heating device;

a steam-water separation device by which two-phase fluid of water and steam generated by transferring the heat collected by the solar collector through the thermal fluid to water in the heat exchanger-including low-temperature heating device is separated into water and steam;

a high-temperature heating device by which the steam separated by the steam-water separation device is superheated by heat of sunlight; and a circulating pump by which the water separated in the steam-water separation device is supplied to the heat exchanger-including low-temperature heating device.

According to a ninth configuration of the invention, there is provided a solar heat boiler according to any one of the first to eighth configurations, wherein:

the circulating pump is placed on a channel extending from the steam-water separation device to the low-temperature heating device.

According to a tenth configuration of the invention, there is provided a solar heat electric power generation plant, including:

a solar heat boiler according to any one of the first to ninth configurations;

a steam turbine which is driven by steam generated by the solar heat boiler; and an electric power generator which is driven by the steam turbine.

According to an eleventh configuration of the invention, there is provided a solar heat electric power generation plant, including:

a boiler which generates steam by burning fuel or generating heat therefrom;

a water supply pump which supplies water to the boiler;

a steam turbine which is driven by steam generated by the boiler;

an electric power generator which is driven by the steam turbine;

a water supply heater which heats the water supplied from the water supply pump using steam extracted from the steam turbine;

a low-temperature heating device including a heat transfer tube which is disposed horizontally so that water supplied from the water supply pump can circulate through the heat transfer tube, and a reflecting mirror which collects sunlight in the heat transfer tube, so that the low-temperature heating device can heat a part of the water by heat of the sunlight;

a steam-water separation device by which two-phase fluid of water and steam generated in the low-temperature heating device is separated into water and steam;

a high-temperature heating device by which the steam separated by the steam-water separation device is heated by heat of sunlight; and a circulating pump by which the water separated by the steam-water separation device is supplied to the low-temperature heating device.

According to a twelfth configuration of the invention, there is provided a solar heat electric power generation plant according to the eleventh configuration, wherein:

the low-temperature heating device, the steam-water separation device and the circulating pump are placed on or near a ground surface, and the high-temperature heating device is placed in a higher site than the low-temperature heating device and the steam-water separation device; and a water level gauge which measures a water level in the steam-water separation device, a water supply valve which adjusts a flow rate of water supplied to the low-temperature heating device, and a circulation flow rate control valve which adjusts the amount of water circulating between the low-temperature heating device and the steam-water separation device are provided so that the flow rate of the supplied water or the amount of the circulating water can be adjusted by the water supply valve or the circulation flow rate control valve with the water level in the steam-water separation device being set at a predetermined value.

According to a thirteenth configuration of the invention, there is provided a solar heat electric power generation plant according to the eleventh or twelfth configuration, wherein:

the low-temperature heating device includes a trough type solar collector in which a heat transfer tube is disposed above an inner circumferential curved surface of a reflecting mirror extending like a trough so that the sunlight can be collected in the heat transfer tube by the reflecting mirror to heat water circulating through the heat transfer tube and generate steam, or a Fresnel type solar collector in which a several number of reflecting mirrors having substantially flat surfaces are arranged side by side and a heat transfer tube is disposed above the group of the reflecting mirrors so that the sunlight can be collected in the heat transfer tube by the group of the reflecting mirrors to heat water circulating through the heat transfer tube and generate steam; and the high-temperature heating device includes a tower type solar collector in which a heat transfer tube panel is placed on a tower having a predetermined height and a large number of reflecting mirrors are disposed so that the sunlight can be collected in the heat transfer tube panel by the group of the reflecting mirrors to heat water circulating through the heat transfer tube panel and generate steam.

According to a fourteenth configuration of the invention, there is provided a solar heat electric power generation plant according to any one of the eleventh to thirteenth configurations, wherein:

a glass tube with a predetermined length is disposed on the periphery of the heat transfer tube with a predetermined length so as to form a double structure, and an airtight state or a vacuum state is kept between the heat transfer tube and the glass tube;

the heat transfer tube with the predetermined length is formed by a plurality of heat transfer tubes joined to each other by welding, and the glass tube with the predetermined length is formed by a plurality of glass tubes joined to each other through metal joint tubes which are disposed in joint portions between the glass tubes and which are welded with the glass tubes respectively; and outlet fluid temperature in the low-temperature heating device is regulated to 300° C. or less.

According to a fifteenth configuration of the invention, there is provided a solar heat electric power generation plant according to the fourteenth configuration, wherein:

a thermometer and a flowmeter are placed in an outlet of the low-temperature heating device and a flow rate of water supplied to the low-temperature heating device is adjusted so that a temperature measured by the thermometer and a flow rate measured by the flowmeter can be set at predetermined values.

According to a sixteenth configuration of the invention, there is provided a solar heat electric power generation plant according to the fourteenth configuration, wherein:

a thermometer and a flowmeter are placed in an outlet of the low-temperature heating device and the amount of collected heat in the low-temperature heating device is adjusted so that a temperature measured by the thermometer and a flow rate measured by the flowmeter can be set at predetermined values.

According to a seventeenth configuration of the invention, there is provided a solar heat electric power generation plant according to any one of the eleventh to thirteenth configurations, wherein:

a thermometer and a flowmeter are placed in an outlet of the low-temperature heating device and the amount of collected heat in the high-temperature heating device is adjusted in accordance with a value of a temperature measured by the thermometer and a value of a flow rate measured by the flowmeter.

According to an eighteenth configuration of the invention, there is provided a solar heat electric power generation plant according to any one of the eleventh to thirteenth configurations, wherein:

a water level gauge which measures a water level in the steam-water separation device, a water supply valve which adjusts a flow rate of water supplied to the low-temperature heating device, and a circulation flow rate control valve which adjusts the amount of water circulating between the low-temperature heating device and the steam-water separation device are provided so that the flow rate of the supplied water or the amount of the circulating water can be adjusted by the water supply valve or the circulation flow rate control valve with the water level in the steam-water separation device being set at a predetermined value.

According to a nineteenth configuration of the invention, there is provided a solar heat electric power generation plant according to any one of the eleventh to thirteenth configurations, wherein:

a steam extraction valve is provided on the outlet side of the steam turbine; and the steam extraction valve is operated in accordance with the amount of steam supplied from the high-temperature heating device, so that a steam extraction_flow in the steam turbine can be adjusted.

Advantageous Effects of Invention

According to the invention configured as described above, it is possible to provide a solar heat boiler capable of avoiding thermal damage to a heat transfer tube without increasing facility cost and construction cost, and capable of suppressing fluctuation in the amount of power generation in a steam turbine to thereby supply high-quality electricity, and an independent type or composite_type solar heat electric power generation plant using the solar heat boiler.

DESCRIPTION OF EMBODIMENTS (First Embodiment)

Figure 1:
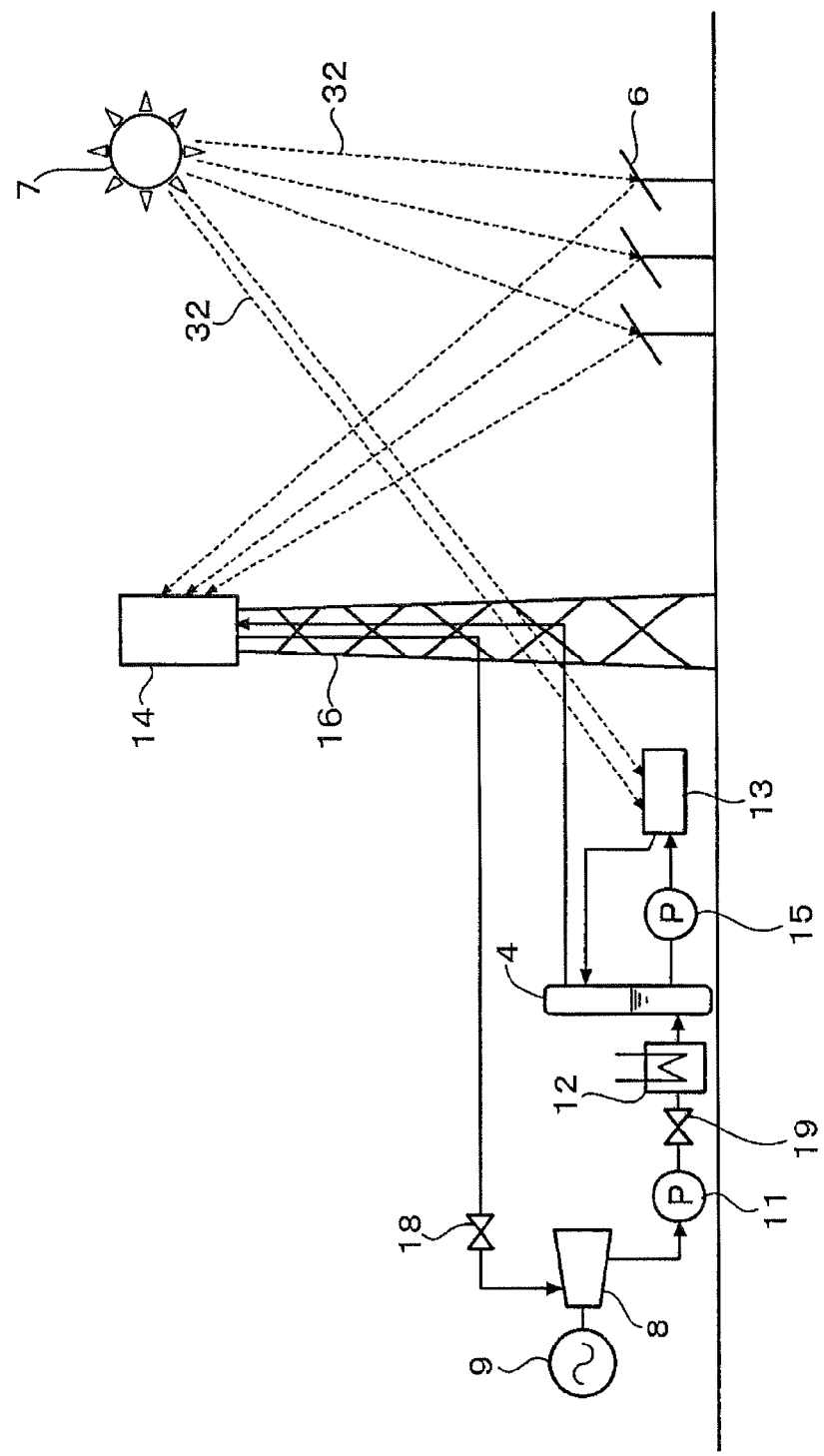
FIG. 1 A schematic configuration diagram of a stand-alone type solar electric power generation plant according to a first embodiment of the invention.

Next, embodiments of the invention will be described with reference to the drawings. FIG. 1 is a schematic configuration diagram of a stand-alone type solar electric power generation plant according to a first embodiment of the invention.

In this solar heat electric power generation plant, as shown in FIG. 1, water supplied from a water supply pump 11 is sent to a water supply heater 12 through a water supply valve 19. The water heated thus by the water supply heater 12 is introduced into a low-temperature heating device 13 through a steam-water separation device 4. In the low-temperature heating device 13, the supplied water is heated by light 32 from the sun 7. The water is circulated between the steam-water separation device 4 and the low-temperature heating device 13 by a circulating pump 15.

Two-phase fluid of water and steam generated in the low-temperature heating device 13 is separated into saturated water and saturated steam by the steam-water separation device 4. The separated steam is sent to a high-temperature heating device 14 placed on a tower 16. The steam introduced into the high-temperature heating device 14 is further superheated by solar heat reflected by heliostats 6 and introduced into the high-temperature heating device 14.

The superheated steam generated in the high-temperature heating device 14 is designed to rotate a steam turbine 8 so that electric power can be generated by an electric power generator 9 due to the rotation of the steam turbine 8. In order to adjust the amount of steam supplied to the steam turbine 8, the water supply valve 19 is placed between the water supply pump 11 and the water supply heater 12, and a steam valve 18 is placed between the high-temperature heating device 14 and the steam turbine 8.

Figure 2:
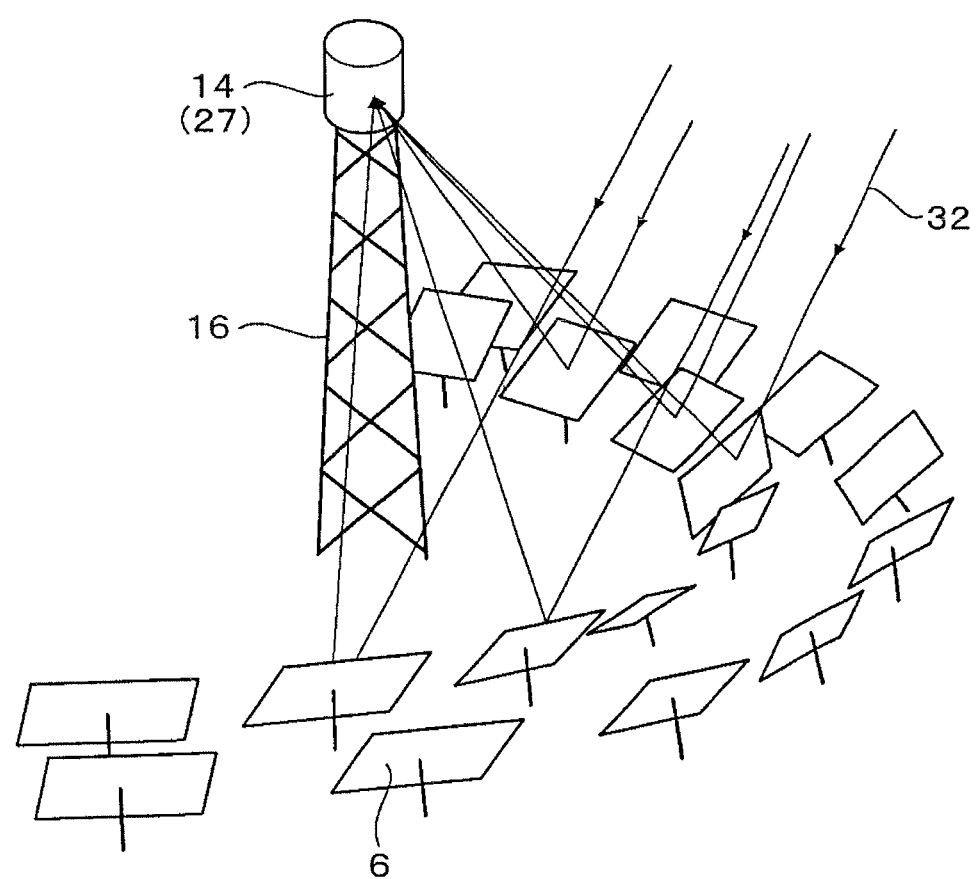
FIG. 2 A view showing principles for explaining the configuration and so on of a tower type solar collector where a high-temperature heating device is placed.

FIG. 2 is a view showing principles for explaining the configuration and so on of a tower type solar collector where the high-temperature heating device 14 is placed.

In the tower type solar collector, as shown in FIG. 2, the high-temperature heating device 14 (heat transfer tube panel 27) is placed on the tower 16 having a predetermined height (about 30 to 100 meters). On the other hand, a large number of heliostats 6 are disposed on the ground surface so as to face in various directions. The heliostats 6 are designed to follow the movement of the sun 7 so that light can be collected in the high-temperature heating device 14 (heat transfer tube panel 27) by the group of the heliostats 6 so as to generate superheated steam.

The tower type solar collector can generate steam at a higher temperature than a trough type solar collector. Thus, the tower type solar collector has a merit that the turbine efficiency can be increased to obtain higher electric power.

Figure 3:
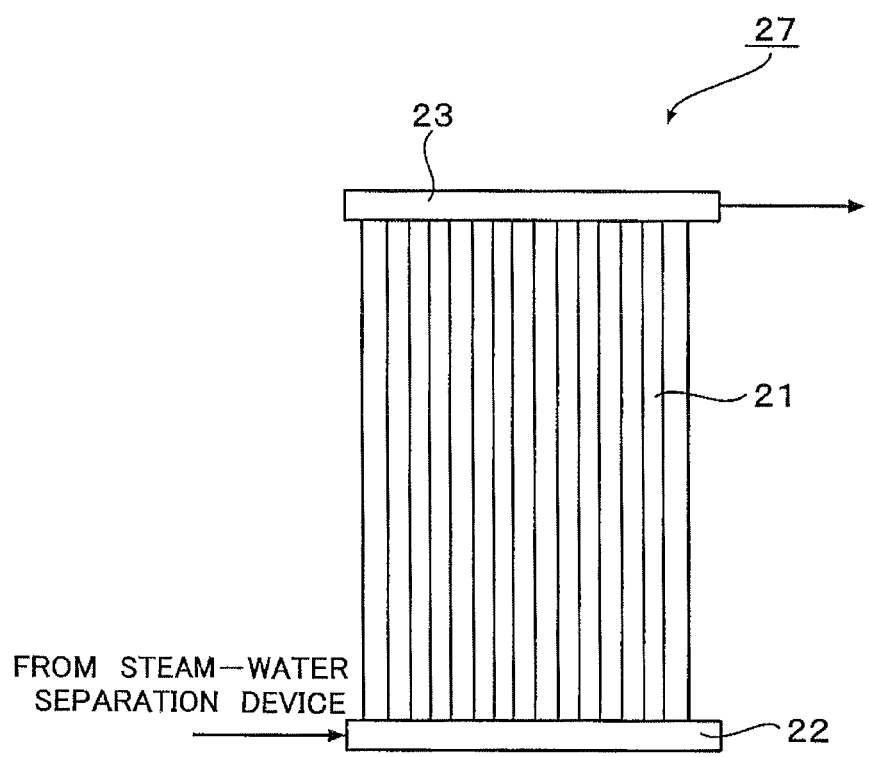
FIG. 3 An enlarged schematic configuration diagram of a heat transfer tube panel for use in the high-temperature heating device.

FIG. 3 is an enlarged schematic configuration diagram of the heat transfer tube panel 27 for use in the high-temperature heating device 14. The heat transfer tube panel 27 is constituted by a superheater lower header 22, a large number of superheater heat transfer tubes 21, and a superheater upper header 23. The superheater lower header 22 distributes steam from the steam-water separation device 4 evenly. The superheater heat transfer tubes 21 are disposed in parallel so that the steam distributed by the superheater lower header 22 can be circulated through the superheater heat transfer tubes 21. The superheater upper header 23 collects superheated steam flowing out from the superheater heat transfer tubes 21. The superheated steam outputted from the superheater upper header 23 is supplied to the steam turbine 8.

The low-temperature heating device 13 and the steam-water separation device 4 hold a large amount of water internally and therefore each device is heavy as a whole. Thus, the low-temperature heating device 13 and the steam-water separation device 4 are placed on the ground surface or near the ground surface by use of a low foundation which is, for example, about 1 to 2 meters high. Since the low-temperature heating device 13 and the steam-water separation device 4 are thus placed on or near the ground surface, it is not necessary to pump up water to a site which is, for example, 30 to 100 meters high as in the background art. Therefore, the water supply pump 11 which is low in pumping-up capacity and low in price can be used.

Figure 18:
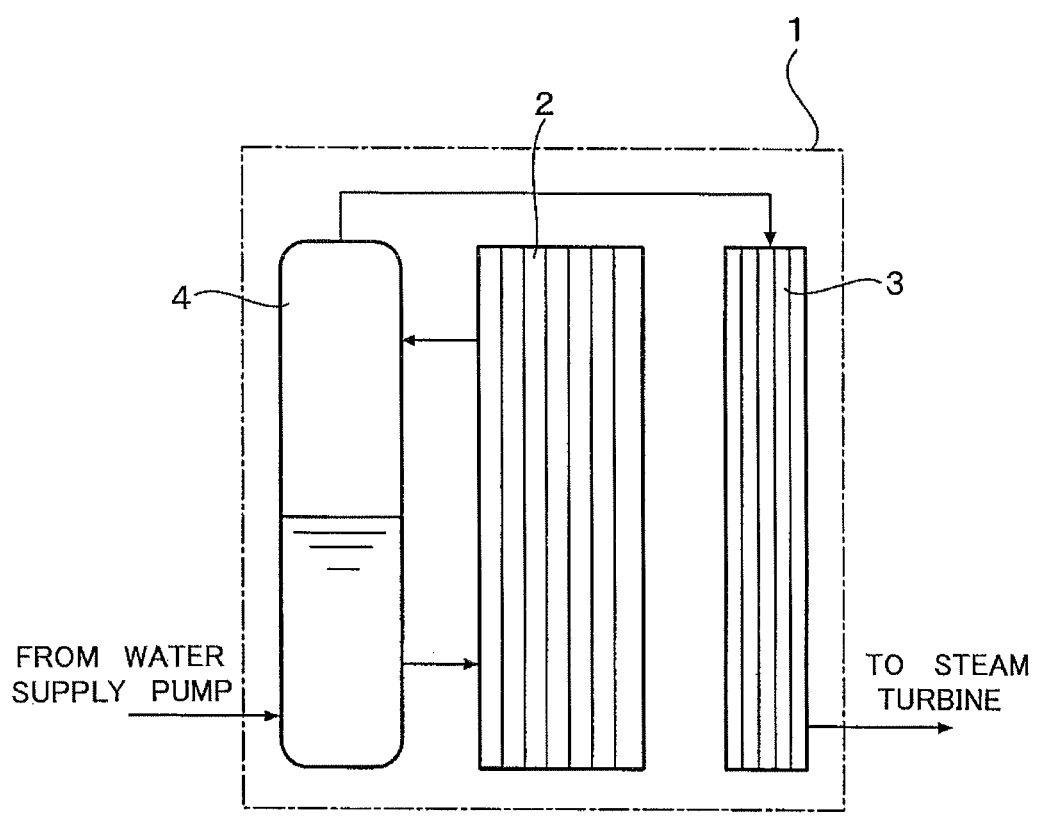
FIG. 18 An enlarged schematic configuration diagram of a heat collecting device for use in the solar heat boiler.
Figure 19:
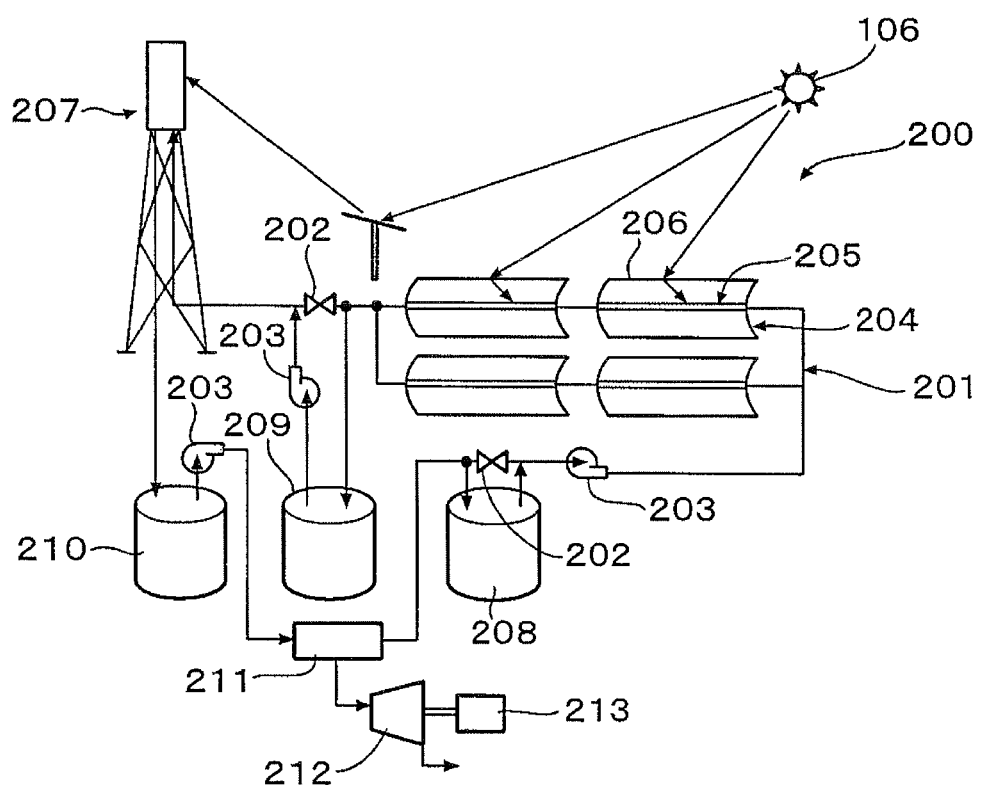
FIG. 19 A schematic configuration diagram of a solar heat electric power generation system proposed in Patent Literature 3.
Figure 20:
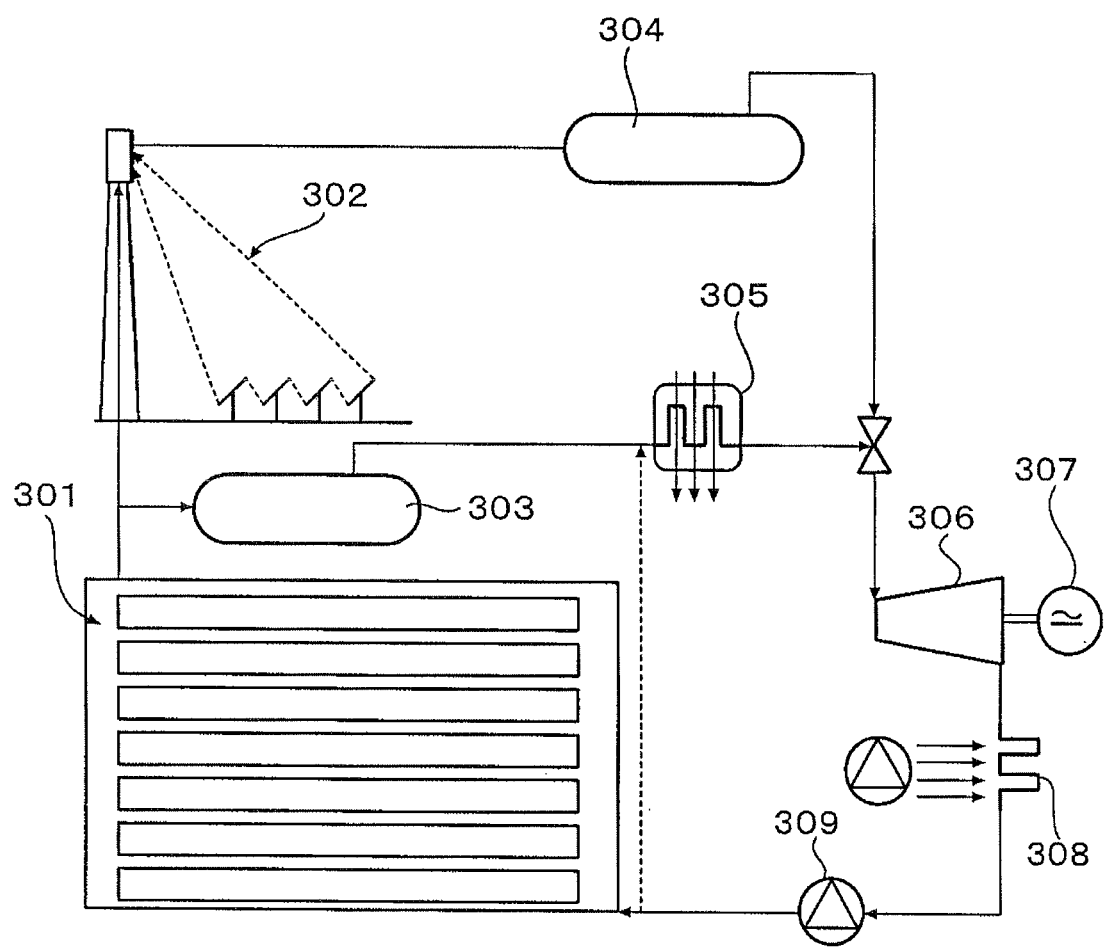
FIG. 20 A schematic configuration diagram of a solar heat/light collecting plant proposed in Patent Literature 4.

On the other hand, light 32 from the heliostats 6 is collected with high optical density in the high-temperature heating device 14. Therefore, the high-temperature heating device 14 is placed in a site which is 10 or more meters (for example, 30 to 100 meters) high from the ground surface. Since fluid flowing inside the high-temperature heating device 14 is only steam, the high-temperature heating device 14 is much lighter in weight and much smaller in size than the background-art heat collecting device 1 (see FIG. 18) which is constituted by the evaporator 2, the superheater 3 and the steam-water separation device 4. Incidentally, the ratio in the amount of collected heat between the low-temperature heating device 13 and the high-temperature heating device 14 is generally 9:1 to 7:3. The amount of collected heat in the high-temperature heating device 14 is much smaller than that of the low-temperature heating device 13.

In the embodiment shown in FIG. 1, the circulating pump 15 is placed on a channel from the steam-water separation device 4 to the low-temperature heating device 13. The use temperature of the circulating pump 15 can be decreased as compared with that in the case where the circulating pump 15 is placed on a channel from the low-temperature heating device 13 to the steam-water separation device 4. Thus, it is not necessary to use a pump which is high in heat resistance and high in price, but it is possible to reduce the cost and improve the reliability. This effect can be also obtained in each embodiment on and after a second embodiment in the same manner.

(Second Embodiment)

Figure 4:
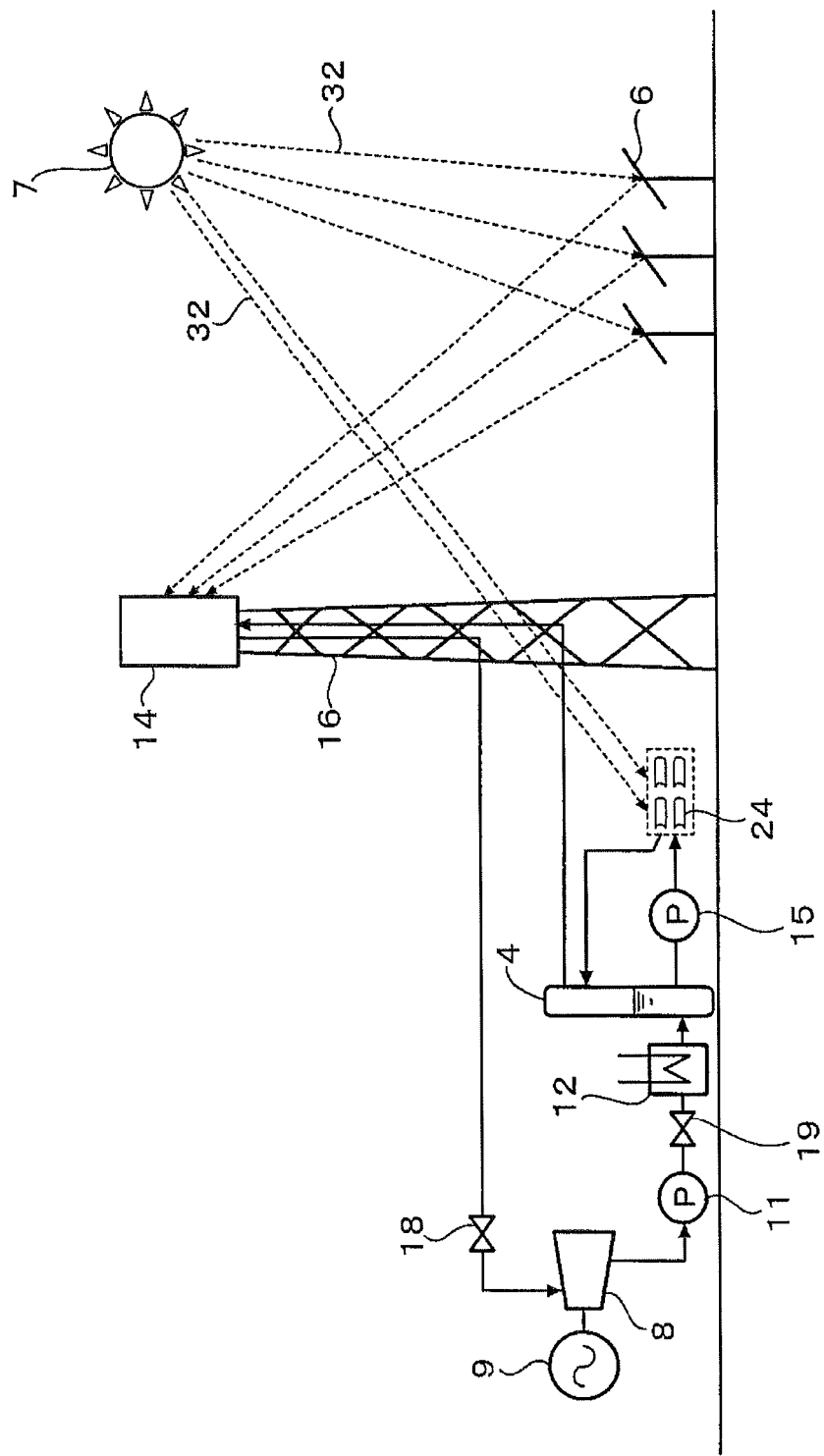
FIG. 4 A schematic configuration diagram of a stand-alone type solar electric power generation plant according to a second embodiment of the invention.

FIG. 4 is a schematic configuration diagram of a stand-alone type solar electric power generation plant according to a second embodiment of the invention.

In the embodiment, a low-temperature heating device 24 consisting of a trough type solar collector is used. The other configuration, the mechanism of electric power generation, etc. are similar to those in the aforementioned first embodiment, and redundant description thereof will be omitted.

Figure 5:
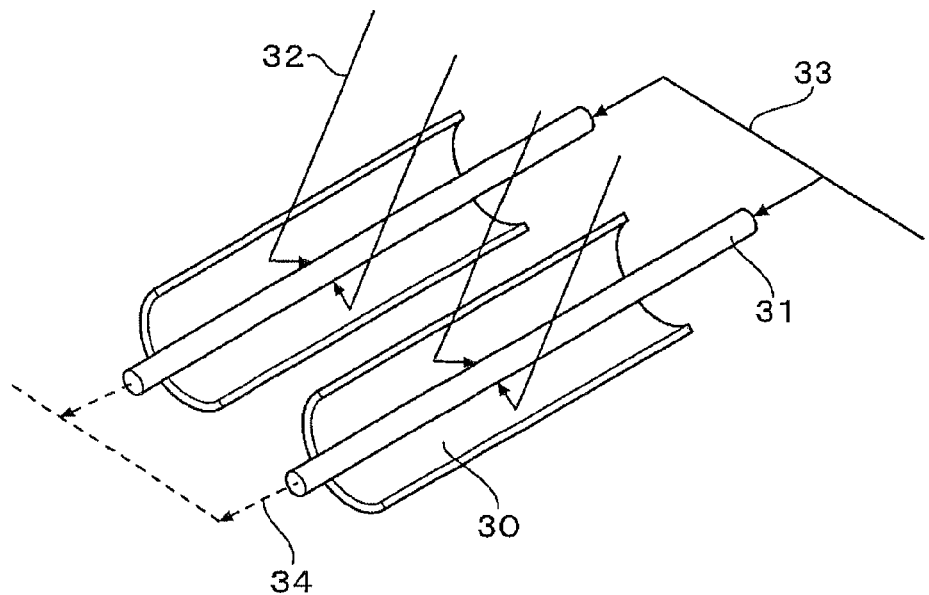
FIG. 5 A view showing principles for explaining the configuration and so on of a trough type solar collector.

FIG. 5 is a view showing principles for explaining the configuration and so on of a trough type solar collector.

The trough type solar collector has the following mechanism, as shown in FIG. 5. That is, a heat transfer tube 31 is disposed horizontally in a focal position above the inner circumferential curved surface of each reflecting mirror 30 extending like a trough, so that sunlight 32 can be collected in the heat transfer tube 31 by the reflecting mirror 30. Water 33 circulates through each heat transfer tube 31. The water 33 is heated by heat collected in the heat transfer tube 31 so that two-phase fluid 34 of water and steam can be obtained from the heat transfer tube 31.

The trough type solar collector has a merit that it does not require any advanced light condensing technique but the structure is comparatively simple.

Although the low-temperature heating device 24 consisting of a trough type solar collector is used in the embodiment, a low-temperature heating device consisting of a Fresnel type solar collector may be used.

Figure 6:
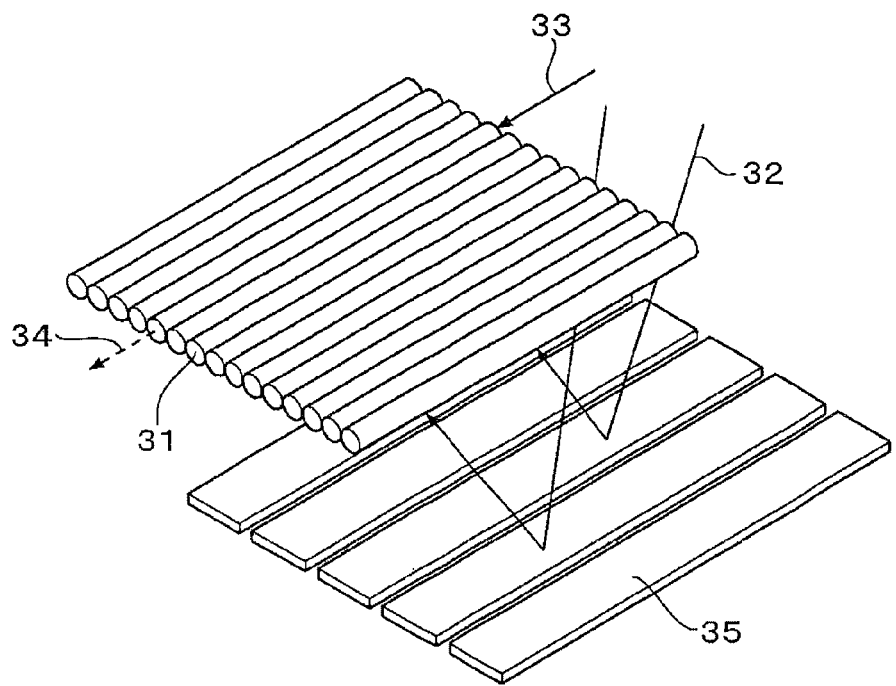
FIG. 6 A view showing principles for explaining the configuration and so on of a Fresnel type solar collector.

FIG. 6 is a view showing principles for explaining the configuration and so on of a Fresnel type solar collector.

The Fresnel type solar collector has the following mechanism, as shown in FIG. 6. That is, a several number of reflecting mirrors 35 having flat surfaces or slightly curved surfaces are arranged side and side at angles differing bit by bit from one to another, and a group of heat transfer tubes 31 formed like a panel are disposed horizontally several meters above the group of the reflecting mirrors 35.

The mechanism works as follows. Sunlight 32 is collected in the group of the heat transfer tubes 31 by the group of the reflecting mirrors 35 so that water 33 circulating through each heat transfer tube 31 can be heated. Thus, two-phase fluid 34 of water and steam can be obtained from the heat transfer tube 31.

The Fresnel type solar collector can be manufactured more easily and more inexpensively than the aforementioned trough type curved reflecting mirrors 30. The Fresnel type solar collector has another merit that the reflecting mirrors 35 are rarely affected by wind pressure.

(Third Embodiment)

Figure 7:
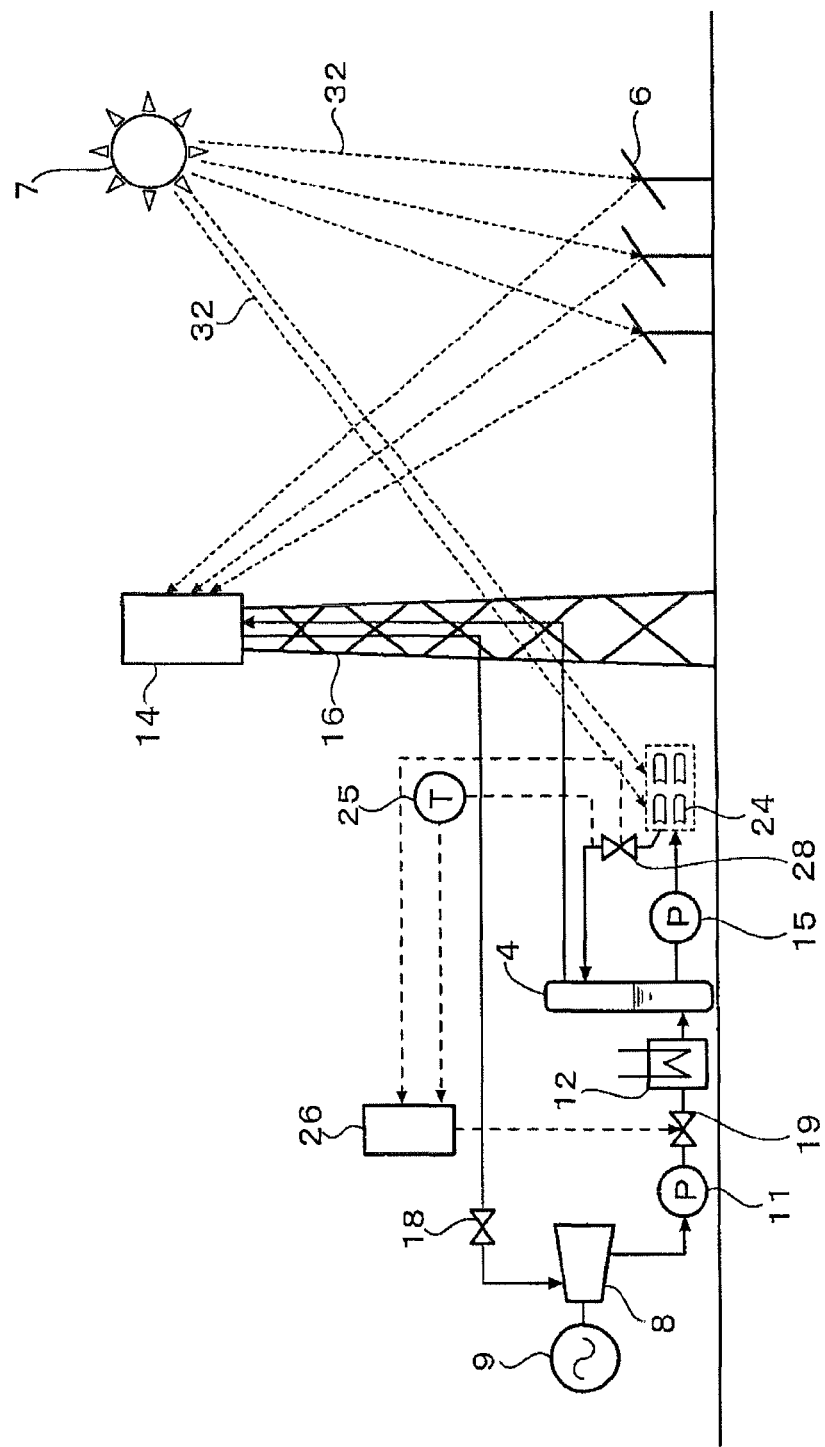
FIG. 7 A schematic configuration diagram of a stand-alone type solar electric power generation plant according to a third embodiment of the invention.

FIG. 7 is a schematic configuration diagram of a stand-alone type solar electric power generation plant according to a third embodiment of the invention.

In the embodiment, as shown in FIG. 7, a thermometer 25 and a flowmeter 28 for measuring the temperature and flow rate of fluid are provided on the outlet side of a low-temperature heating device 24. Measurement signals of the thermometer 25 and the flowmeter 28 are supplied to an arithmetic unit 26. In the arithmetic unit 26, a control signal for controlling the opening degree of a water supply valve 19, that is, the flow rate of water supply is outputted to the water supply valve 19 so as to make the outlet fluid temperature of the low-temperature heating device 24 always not higher than 300° C.

When the outlet fluid temperature of the low-temperature heating device 24 is limited to 300° C. or less in this manner, there is a merit that the structure of the low-temperature heating device 24 consisting of a trough type (or Fresnel type) solar collector can be simplified while the lowering of the heat transfer efficiency can be suppressed. Specifically, it is impossible to suppress cracking in a peripheral glass tube caused by a difference in thermal expansion between the heat transfer tube and the peripheral glass tube and radiative cooling caused by increase in surface temperature of the heat transfer tube, which are problems to be solved when a trough type (or Fresnel type) solar collector is used under high temperature.

Figure 8:
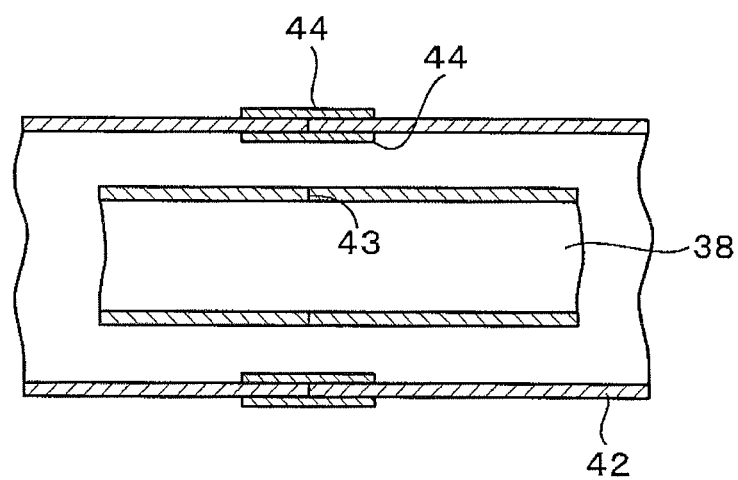
FIG. 8 A partially enlarged sectional view showing the vicinities of a heat transfer tube for use in a trough type (or Fresnel type) solar collector.

FIG. 8 is a partially enlarged sectional view showing the vicinities of a heat transfer tube for use in a trough type (or Fresnel type) solar collector. As shown in FIG. 8, a peripheral glass tube 42 is disposed on the periphery of a horizontal heat transfer tube 38 so as to form a double structure. The peripheral glass tube 42 is provided to make an airtight state or a vacuum state between the horizontal heat transfer tube 38 and the peripheral glass tube 42 so that heat radiation from the horizontal heat transfer tube 38 to the outside air can be suppressed.

A plurality of heat transfer tubes 38 are joined together as one long heat transfer tube 38. The heat transfer tubes 38 are made of metal such as carbon stainless steel. Therefore, the heat transfer tubes 38 may be formed into a predetermined length by welding 43 with each other as shown in FIG. 8.

On the other hand, peripheral glass tubes 42 cannot be welded with each other directly. As shown in FIG. 8, joint tubes 44 made of metal are disposed on the inner and outer sides of a joint portion between peripheral glass tubes 42, and the peripheral glass tubes 42 are welded with the joint tubes 44 so as to form a structure in which the peripheral glass tubes 42 are joined to each other through the joint tubes 44 to have a predetermined length.

The heat transfer tube 38 jointed into a predetermined length is inserted inside the peripheral glass tube 42 joined into a predetermined length in this manner, and attached into the solar collector. Thus, when the difference in thermal expansion between the heat transfer tube 38 and the peripheral glass tube 42 increases, cracking may occur near the joint portion between the peripheral glass tube 42 and the joint tube 44.

In addition, there is another problem that heat radiation to the outside air may increase due to a radiative cooling phenomenon (movement of heat in the fourth power of a temperature difference) when the difference in temperature between the surface temperature of the heat transfer tube 38 and the outside air increases due to increase in the surface temperature of the heat transfer tube 38.

In the embodiment, therefore, the outlet fluid temperature of the low-temperature heating device 24 is limited to 300° C. or less, specifically within a range of from 250° C. to 300° C., so as to suppress cracking in the peripheral glass tube 42 caused by the difference in thermal expansion between the heat transfer tube 38 and the peripheral glass tube 42 and the radiative cooling caused by increase in surface temperature of the heat transfer tube 38.

The amount of collected heat in the high-temperature heating device 14 can be adjusted based on the measurement signals of the thermometer 25 and the flowmeter 28 so as to make the outlet fluid temperature of the high-temperature heating device 14 not lower than 300° C. The opening degree of the water supply valve 19 is adjusted to change the flow rate of water supply to thereby adjust the amount of the collected heat.

The other configuration, the mechanism of electric power generation, etc. are similar to those in the aforementioned second embodiment, and redundant description thereof will be omitted.

Although the thermometer 25 and the flowmeter 28 are placed on the outlet side of the low-temperature heating device 24 and the flow rate of water supply to the low-temperature heating device 24 is adjusted to set the measured temperature and flow rate at predetermined values in the embodiment, the amount of collected heat in the low-temperature heating device 24 may be adjusted so that the temperature and flow rate measured by the thermometer 25 and the flowmeter 28 placed on the outlet side of the low-temperature heating device 24 can be set at predetermined values.

(Fourth Embodiment)

Figure 9:
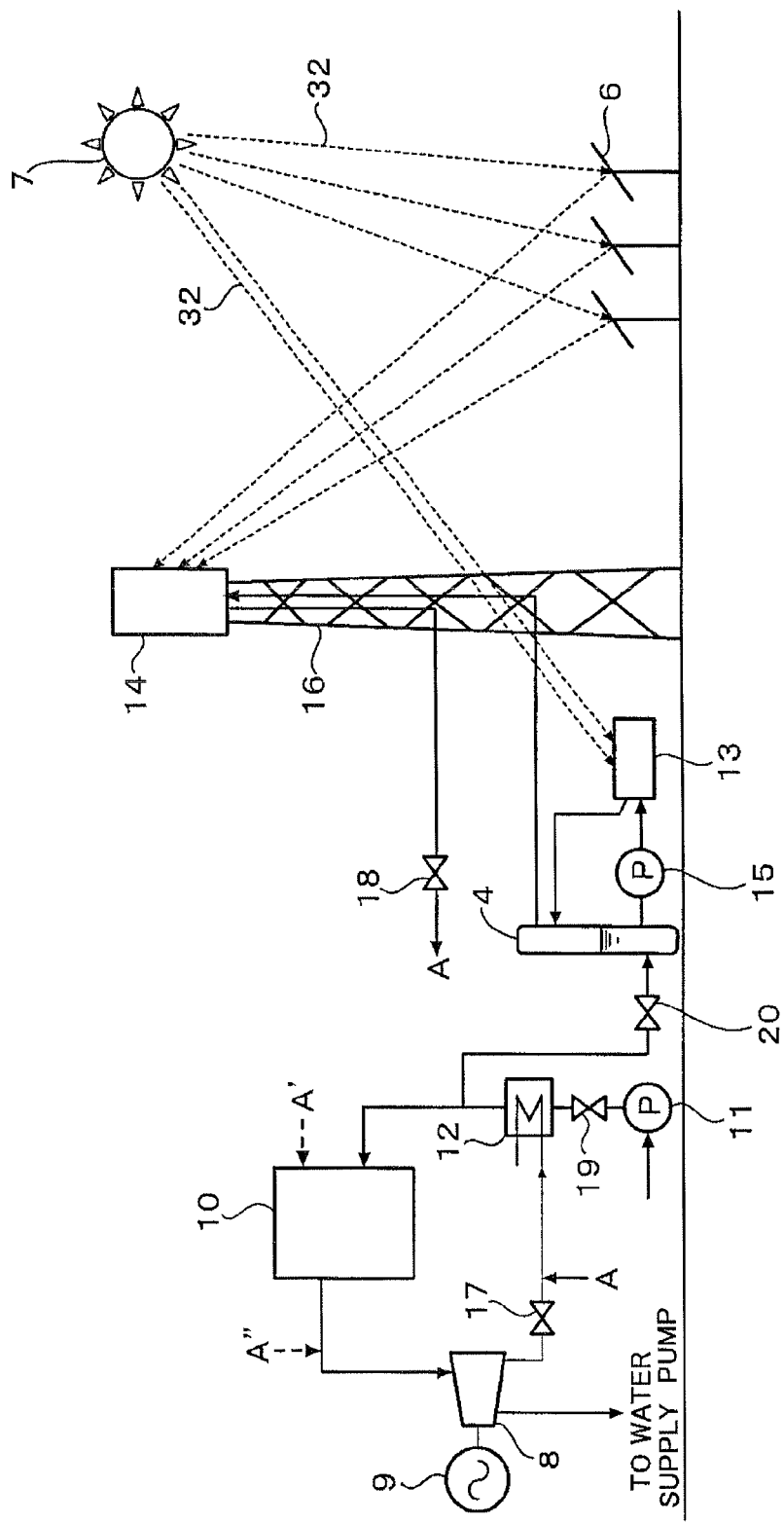
FIG. 9 A schematic configuration diagram of a solar heat integrated type electric power generation plant according to a fourth embodiment of the invention.

FIG. 9 is a schematic configuration diagram of a solar heat integrated type electric power generation plant according to a fourth embodiment of the invention, in which a boiler plant and a solar heat electric power generation plant are combined so that steam can be generated by burning of fuel, heat generated therefrom (for example, in the case of nuclear fuel), or heat recovered from exhaust gas.

The solar heat integrated type electric power generation plant includes a boiler plant 10, a water supply pump 11, a steam turbine 8, a water supply heater 12, etc. in addition to the solar heat electric power generation plant shown in FIG. 1. In the boiler plant 10, steam is generated by burning of fuel, heat generated therefrom, or heat recovered from exhaust gas. The water supply pump 11 supplies water to the boiler plant 10. The steam turbine 8 is driven by superheated steam generated by the boiler plant 10. In the water supply heater 12, the water supplied from the water supply pump 11 is heated using steam extracted from the steam turbine 8.

In the solar heat integrated type electric power generation plant, a major part of the water supplied from the water supply pump 11 is supplied to the boiler plant 10, and the water is finally converted into superheated steam by burning of not-shown fuel or heat generated therefrom. The superheated steam is sent to the steam turbine 8 to operate an electric power generator 9, which generates electric power.

On the other hand, a part of the steam is extracted from the steam turbine 8 and sent to the water supply heater 12 through an steam extraction valve 17 so as to heat the supplied water.

Of the water supplied from the water supply pump 11, the water excluding the water supplied to the boiler plant 10 is supplied to a low-temperature heating device 13 through a water supply valve 20. The water is heated by light 32 of the sun 7 and made into two-phase fluid of water and steam, in which a part of the water has been converted into steam. The two-phased fluid of water and steam flows into a steam-water separation device 4. The two-phased fluid of water and steam is separated into saturated steam and saturated water by the steam-water separation device 4. The saturated water is supplied again to the low-temperature heating device 13 by a circulating pump 15. The saturated steam separated by the steam-water separation device 4 is heated by a high-temperature heating device 14 and formed into high-temperature steam. The high-temperature steam is sent to the water supply heater 12 (from A to A in FIG. 9).

In addition, as shown in FIG. 9, the high-temperature steam heated by the high-temperature heating device 14 may be supplied to the boiler plant 10 (from A to A' in FIG. 9) or may be supplied to the steam turbine 8 together with the superheated steam outputted from the boiler plant 10 (from A to A" in FIG. 9).

Figure 10:
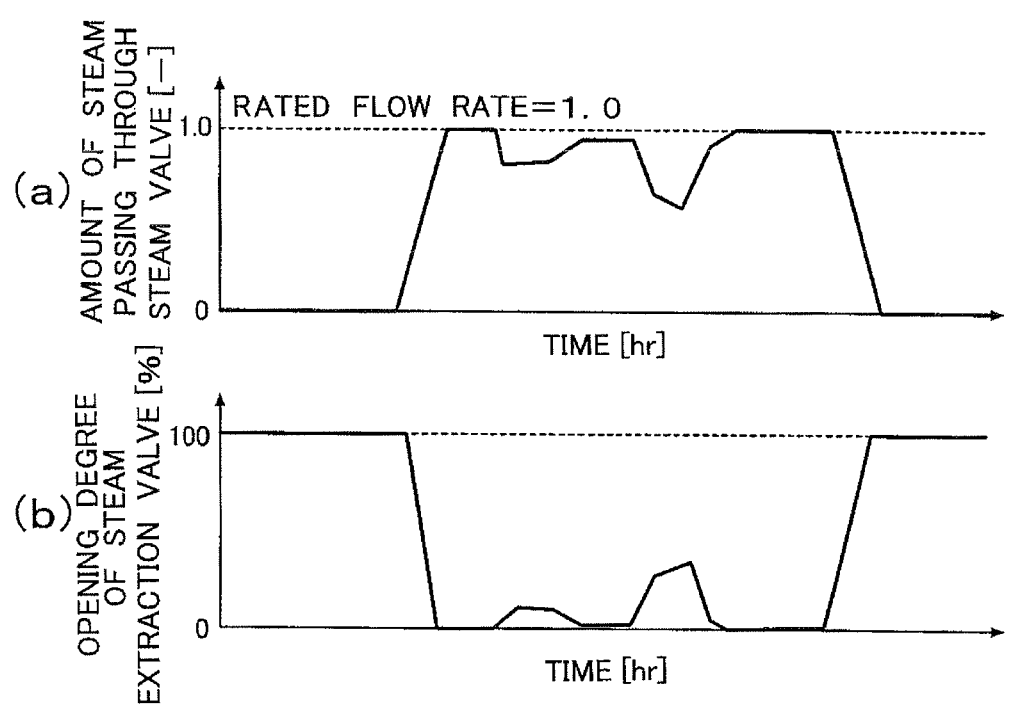
FIG. 10 A diagram showing an example in which the opening degree of a steam extraction valve provided on the outlet side of a steam turbine is adjusted in accordance with a change in the amount of steam passing through a steam valve provided on the outlet side of a high-temperature heating device according to the fourth embodiment.

FIG. 10 is a diagram showing an example in which the opening degree of the steam extraction valve 17 provided on the outlet side of the steam turbine 8 is adjusted (see FIG. 10(b)) in accordance with a change in the amount of steam passing through a steam valve 18 provided on the outlet side of the high-temperature heating device 14 (see FIG. 10(a)) as shown in FIG. 9.

As shown in FIG. 10, the opening degree of the steam extraction valve 17 is reduced with the increase in the amount of steam passing through the steam valve 18, and on the contrary, the opening degree of the steam extraction valve 17 is increased with the decrease in the amount of steam passing through the steam valve 18. In this manner, the steam extraction valve 17 is operated in accordance with the amount of steam supplied from the high-temperature heating device 14, so as to increase/decrease (adjust) the amount of extracted steam in the steam turbine 8. Thus, large fluctuation in the output of electric power generation can be avoided.

The adjustment of the amount of extracted steam in the steam turbine 8 in accordance with the amount of steam supplied from the high-temperature heating device 14 may be also applied to the following embodiments.

(Fifth Embodiment)

Figure 11:
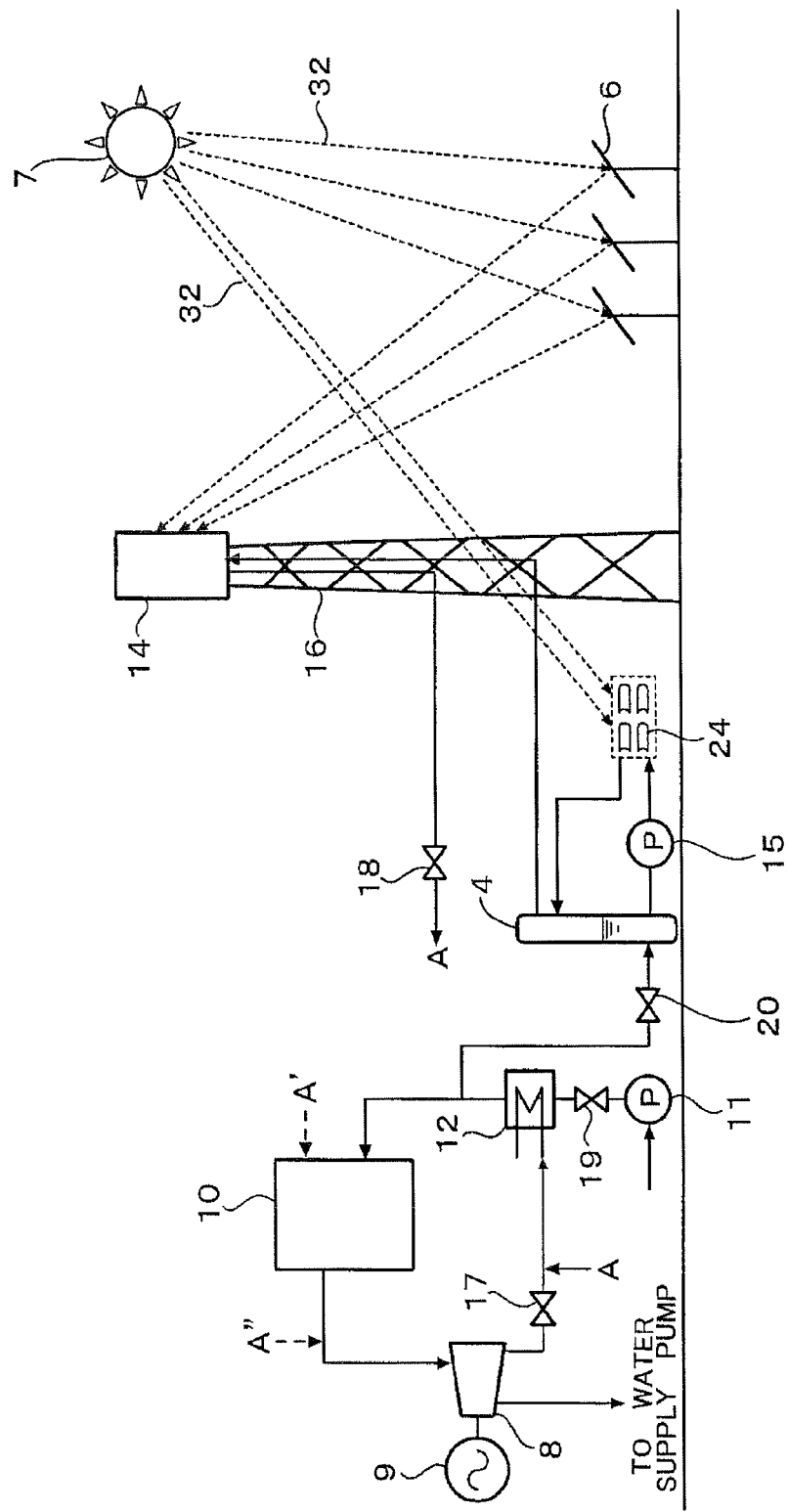
FIG. 11 A schematic configuration diagram of a solar heat integrated type electric power generation plant according to a fifth embodiment of the invention.

FIG. 11 is a schematic configuration diagram of a solar heat integrated type electric power generation plant according to a fifth embodiment of the invention.

The embodiment is different from the aforementioned fourth embodiment in that a low-temperature heating device 24 consisting of a trough type or Fresnel type solar collector is used.

The other configuration, the mechanism of electric power generation, etc. are similar to those in the aforementioned fourth embodiment, and redundant description thereof will be omitted.

(Sixth Embodiment)

Figure 12:
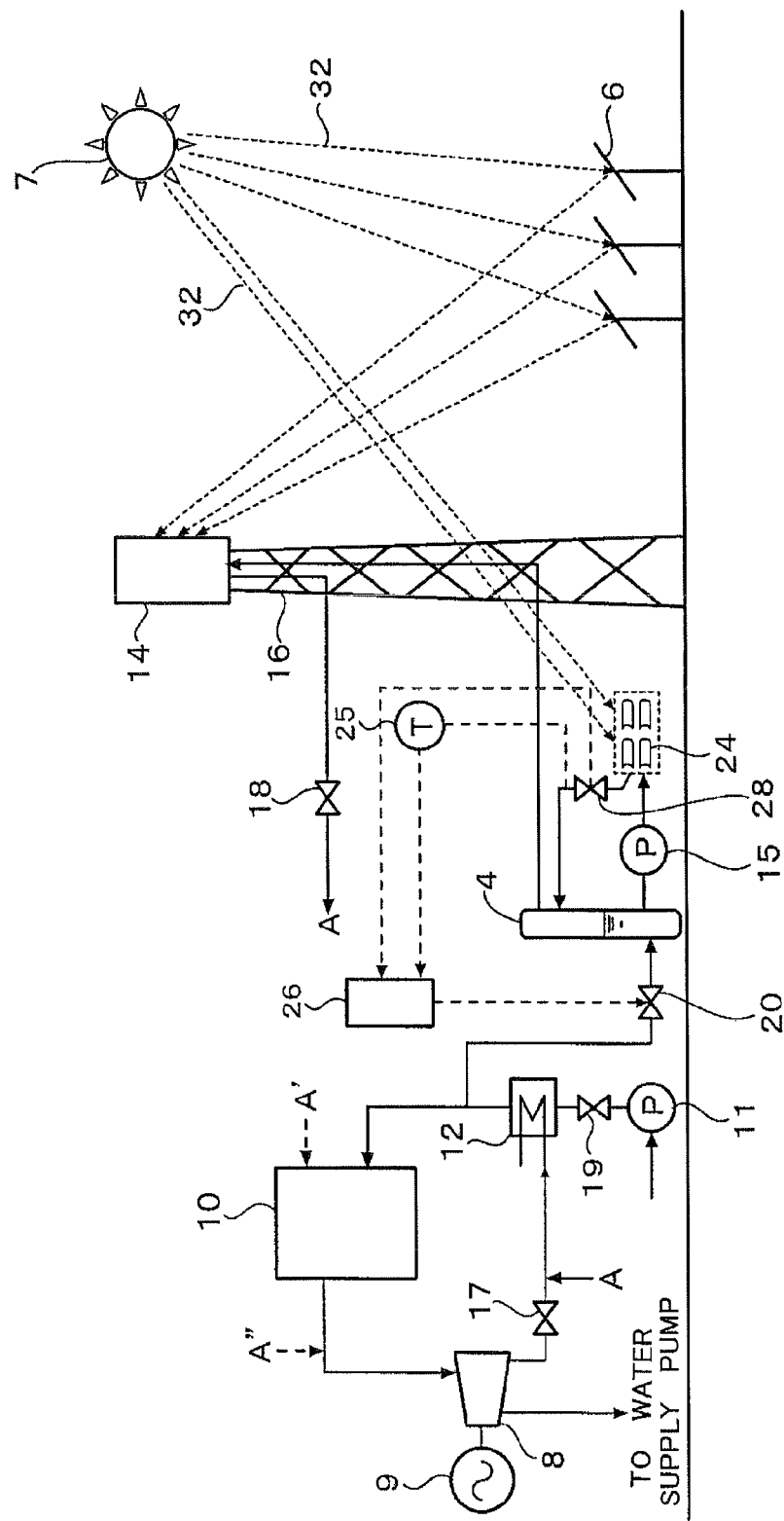
FIG. 12 A schematic configuration diagram of a solar heat integrated type electric power generation plant according to a sixth embodiment of the invention.

FIG. 12 is a schematic configuration diagram of a solar heat integrated type electric power generation plant according to a sixth embodiment of the invention.

In the embodiment, as shown in FIG. 12, a thermometer 25 for measuring the temperature of fluid and a flowmeter 28 are provided on the outlet side of a low-temperature heating device 24. Measurement signals of the thermometer 25 and the flowmeter 28 are supplied to an arithmetic unit 26. In the arithmetic unit 26, a control signal for controlling the opening degree of a water supply valve 20, that is, the flow rate of water supply is outputted to the water supply valve 20 so as to make the outlet fluid temperature of the low-temperature heating device 24 always not higher than 300° C.

The reason why the outlet fluid temperature of the low-temperature heating device 24 is limited thus to 300° or less is similar to that in the aforementioned third embodiment, and redundant description thereof will be omitted.

(Seventh Embodiment)

In any of the aforementioned embodiments, the low-temperature heating device 13 (24) and the high-temperature heating device 14 serve as Solar collectors by which fluid consisting of steam (water) for finally driving the steam turbine 8 is used as a thermal fluid which is heated directly by the light 32 of the sun 7.

Accordingly, the solar heat boiler will use no other heat exchanger but the low-temperature heating device 13 (24) and the high-temperature heating device 14. Thus, there is an advantage that the configuration of the boiler as a whole is simple enough to thereby achieve reduction in the size and cost or the like.

On the other hand, when the fluid consisting of water and steam is heated directly by the light 32 of the sun 7, a change of phase from water to steam may occur within a heat transfer tube in a Fresnel type or trough type solar collector particularly for use in the low-temperature heating device 13 (24). When a two-phase flow is generated, there is a possibility that the heat transfer tube may be thermally damaged locally.

That is, particularly in the Fresnel type or trough type solar collector, of the peripheral surface of the heat transfer tube disposed horizontally, a region where light is collected receives heat. Therefore, the Fresnel type or trough type solar collector has a structure in which an uneven distribution of heat flux may be generated easily over the periphery of the heat transfer tube.

For this reason, when the internal fluid forms a two-phase flow, there is a possibility that abnormality in heat transfer may occur due to an instant change in the amount of collected light and heat, so as to cause thermal damage to that portion of the heat transfer tube.

In the Fresnel type or trough type solar collector, a long heat transfer tube is disposed substantially horizontally and placed in a wide area. The amount of collected heat derived from the sunlight fluctuates largely in a day, or changes suddenly depending on the weather. It is therefore difficult to beforehand specify the region where two-phase fluid may flow.

As a result, there is a problem that the heat transfer tube must be entirely made of a high-performance material, that is, an expensive material that hardly suffers thermal damage, thereby causing the increase in cost.

Figure 13:
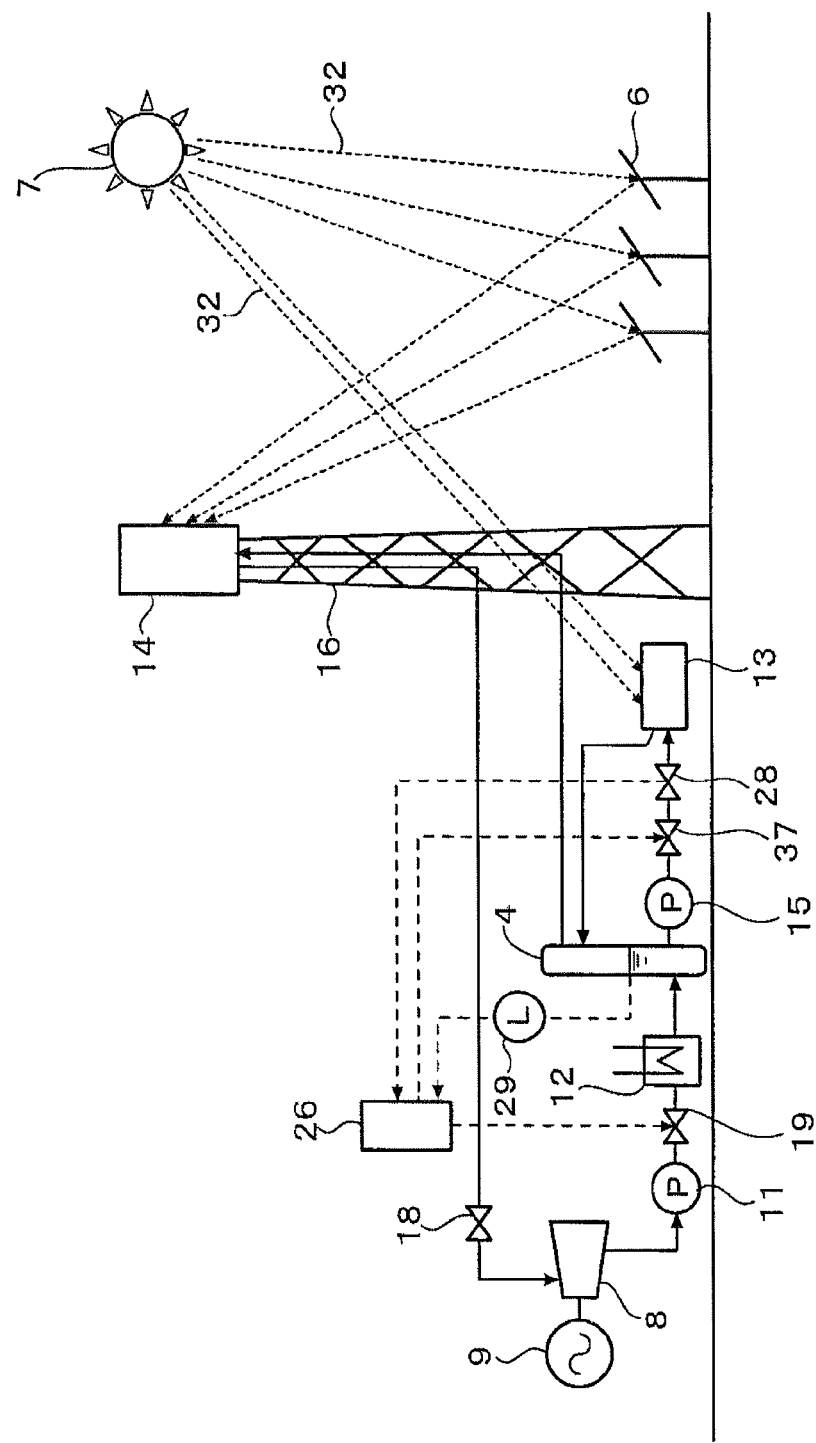
FIG. 13 A schematic configuration diagram of a stand-alone type solar electric power generation plant according to a seventh embodiment of the invention.

The seventh embodiment of the invention is a solution to such a problem. FIG. 13 is a schematic configuration diagram of a solar heat independent type electric power generation plant according to the seventh embodiment.

In the embodiment, as shown in FIG. 13, a water supply circulating flow rate control valve 37 and a flowmeter 28 for adjusting the circulating flow rate are provided on the inlet side of a low-temperature heating device 13, and a water level gauge 29 for detecting the water level of a steam-water separation device 4 is provided.

A flow rate measurement signal of the flowmeter 28 and a water level measurement signal of the water level gauge 29 are supplied to an arithmetic unit 26, which outputs a control signal to a water supply valve 19 for adjusting the flow rate of water supply and (or) the water supply circulating flow rate control valve 37 for adjusting the circulating flow rate, so that the water level of the steam-water separation device 4 can be set at an intended value.

When the water level of the steam-water separation device 4 is controlled as in this embodiment, operation can be made to prevent phase separation from occurring in the heat transfer tube of the low-temperature heating device 13. This principle will be described with reference to FIG. 14 and FIG. 15.

Figure 14:
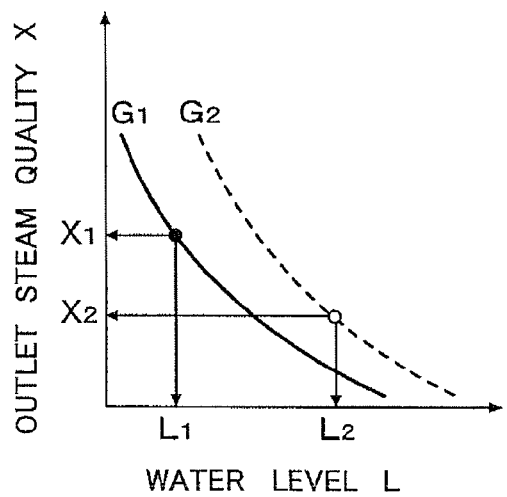
FIG. 14 A characteristic graph showing the relationship between a water level L in a steam-water separation device and an outlet steam quality X in a low-temperature heating device.
Figure 15:
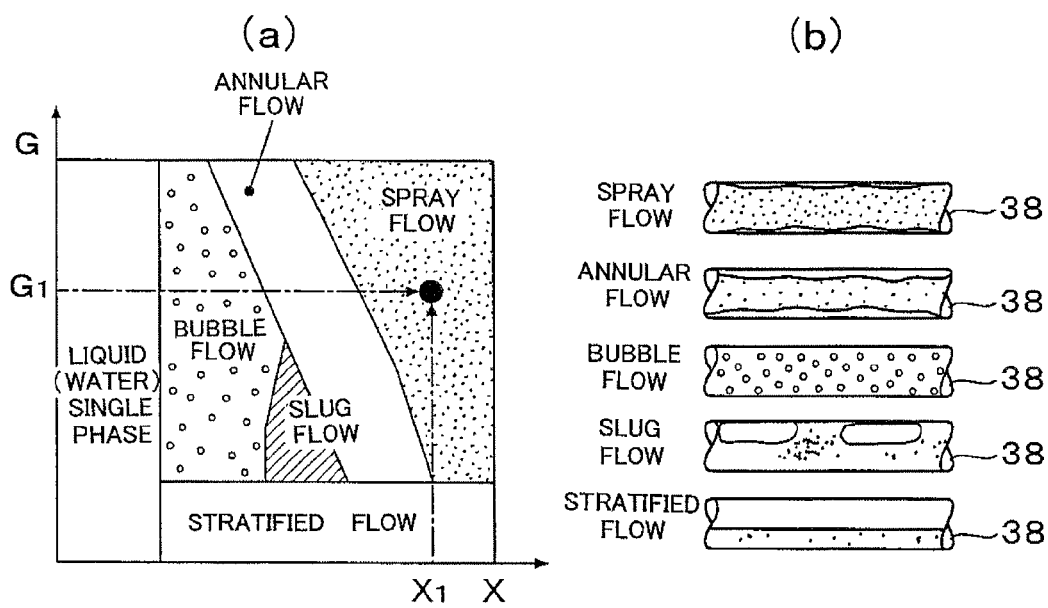
FIG. 15 (a) is a view showing classification of fluid states in a two-phase flow of water and steam in a horizontal heat transfer tube of a low-temperature heating device, and (b) is a schematic view showing each fluid state of the two-phase flow of water and steam in the horizontal heat transfer tube.

FIG. 14 is a characteristic graph showing the relationship between a water level L (abscissa) in the steam-water separation device 4 and an outlet steam quality (ratio of steam mass flow rate to total mass flow rate) X (ordinate) in the low-temperature heating device 13. A total mass flow rate G of the steam-water separation device 4 is used as a parameter for showing the relationship between the water level L and the outlet steam quality X.

The outlet steam quality X of the low-temperature heating device 13 corresponds to the ratio of the mass flow rate of steam to the total mass flow rate G. In addition, the total mass flow rate G of the steam-water separation device 4 corresponds to the flow rate of fluid circulating in the low-temperature heating device 13 through the steam-water separation device 4.

FIG. 15(a) is a view showing respective regions of classified fluid states in a two-phase flow of water and steam in the horizontal heat transfer tube 38 of the low-temperature heating device 13, with the outlet steam quality X of the low-temperature heating device 13 in the abscissa and the total mass flow rate G of the steam-water separation device 4 in the ordinate. The classified fluid states include a spray flow, an annular flow, a bubble flow, a slug flow and a stratified flow.

FIG. 15(b) is a schematic view showing each fluid state of the two-phase flow of water and steam in the horizontal heat transfer tube 38. In FIG. 15(b), the states of a spray flow, an annular flow, a bubble flow, a slug flow and a stratified flow are depicted.

In the FIG. 15(b), in the state where the two-phase flow of water and steam is a spray flow, a major part of the two-phase flow in the tube is steam, and very small water drops accompanied by the steam flow in the steam. In the state of the annular flow, a very thin water film is formed on the tube wall, and a spray flow chiefly consisting of steam is located inside the water film. In the state of the bubble flow, a major part of the tube is filled with water, and small bubbles are present in the water. In the state of the slug flow, bubbles are much larger in size than in the aforementioned bubble flow, showing an intermediate state between the bubble flow and the stratified flow. In the state of the stratified flow, a vapor phase and a liquid phase are vertically separated by the effect of gravity.

Therefore, a preferred flow state for the two-phase flow of water and steam in the horizontal heat transfer tube 38 is the spray flow or the annular flow.

As apparent from the aforementioned result of FIG. 14, it is known that there is a correlation between the water level L of the steam-water separation device 4 and the outlet steam quality (the ratio of the steam flow rate to the total mass flow rate) X of the low-temperature heating device 13. Accordingly, for example, an outlet steam quality $X_1$ of the low-temperature heating device 13 can be obtained by measurement of a water level $L_1$ of the steam-water separation device 4 in a mass flow rate $G_1$ of the steam-water separation device 4.

Next, as shown in FIG. 15(a), the flow state of the two-phase flow of water and steam in the low-temperature heating device 13 can be grasped if the outlet steam quality X of the low-temperature heating device 13 and the total mass flow rate G of the steam-water separation device 4 are known. When description is made along the example shown in FIG. 14, it is understood that the outlet steam quality is $X_1$ when the water level of the steam-water separation device 4 is $L_1$ in the condition that the mass flow rate is $G_1$.

From FIG. 15(a), it is understood that the flow state of the two-phase flow of water and steam in the horizontal heat transfer tube 38 of the low-temperature heating device 13 is a spray flow because the outlet steam quality is $X_1$ when the mass flow rate is $G_1$.

In order to prevent phase separation from being generated in the horizontal heat transfer tube of the low-temperature heating device 13, the flow state of the bubble flow, the annular flow or the spray flow is preferred in any operation conditions. When a thermal load on the low-temperature heating device 13 is high, it is particularly desired to set the flow state in the annular flow or the spray flow.

In the tube of the low-temperature heating device 13 which is heated on one side as shown in FIG. 13, the horizontal heat transfer tube 38 is superheated locally when the flow is separated into two phases of water and steam as in the slug flow or the stratified flow shown in FIG. 15(b). As a result, there occurs an undesired event, such as high-temperature creep or tube deformation, for stable operation of the electric power generation plant. It is therefore extremely important on stable operation of the electric power generation plant to properly manage the flow state of the two-phase flow of water and steam in the low-temperature heating device 13.

Accordingly, in the embodiment, an intended value of the water level in the steam-water separation device 4 corresponding to each value of the outlet steam quality X to make a desired flow state as described above is stored in the arithmetic unit 26 in advance. Measurement signals of the flow rate of the flowmeter 28 and the water level of the water level gauge 29 are supplied to the arithmetic unit 26. The arithmetic unit 26 is designed to output a control signal to the water supply valve 19 for adjusting the flow rate of water supply and (or) the water supply circulating flow rate control valve 37 for adjusting the circulating flow rate, so that the water level of the steam-water separation device 4 can be set at the intended value. Thus, the electric power generation plant can be operated stably.

Although the embodiment has been described in the case of a stand-alone type solar electric power generation plant, the invention can be also applied to the case of a solar heat composite type electric power generation plant.

(Eighth Embodiment)

Figure 16:
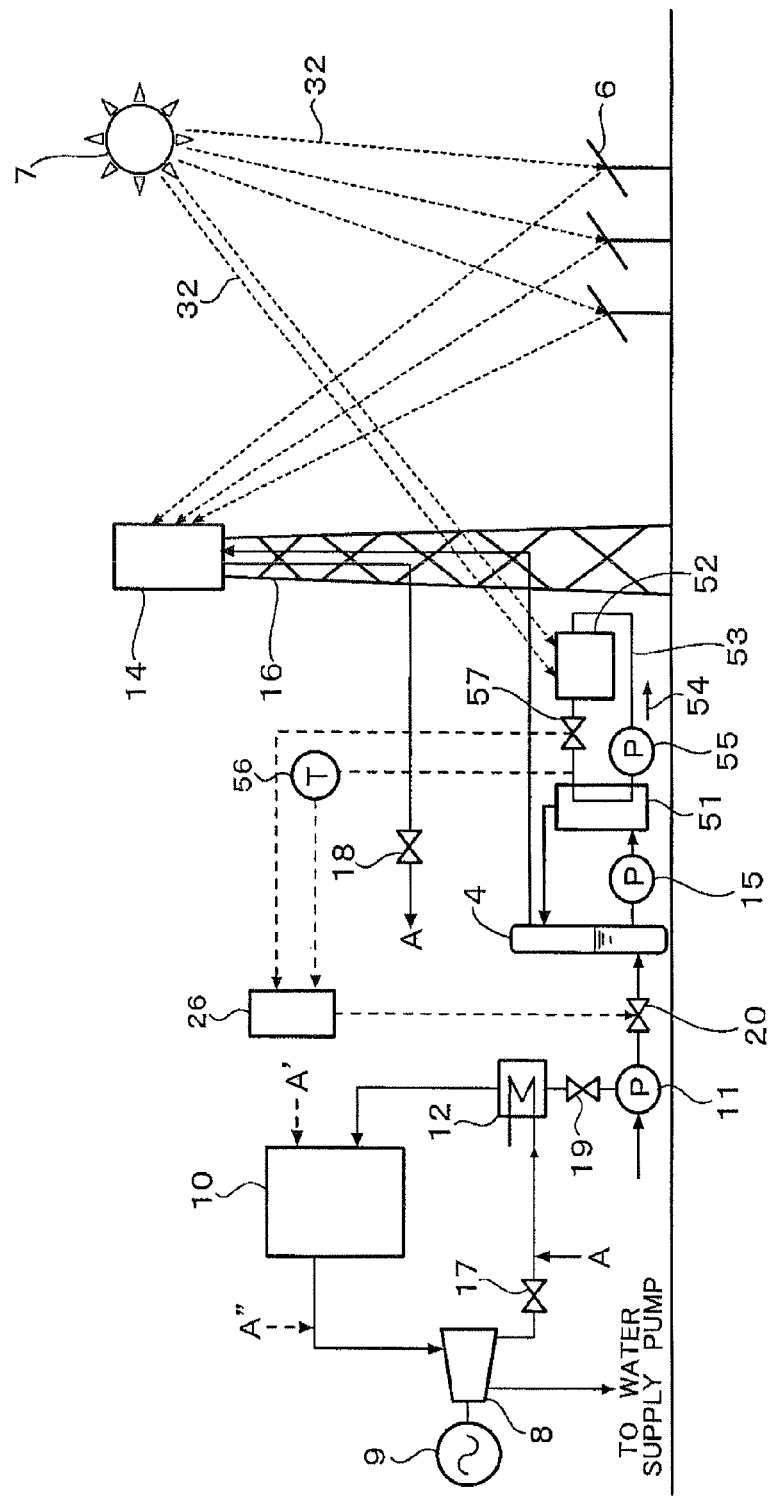
FIG. 16 A schematic configuration diagram of a solar heat integrated type electric power generation plant according to an eighth embodiment of the invention.
Figure 17:
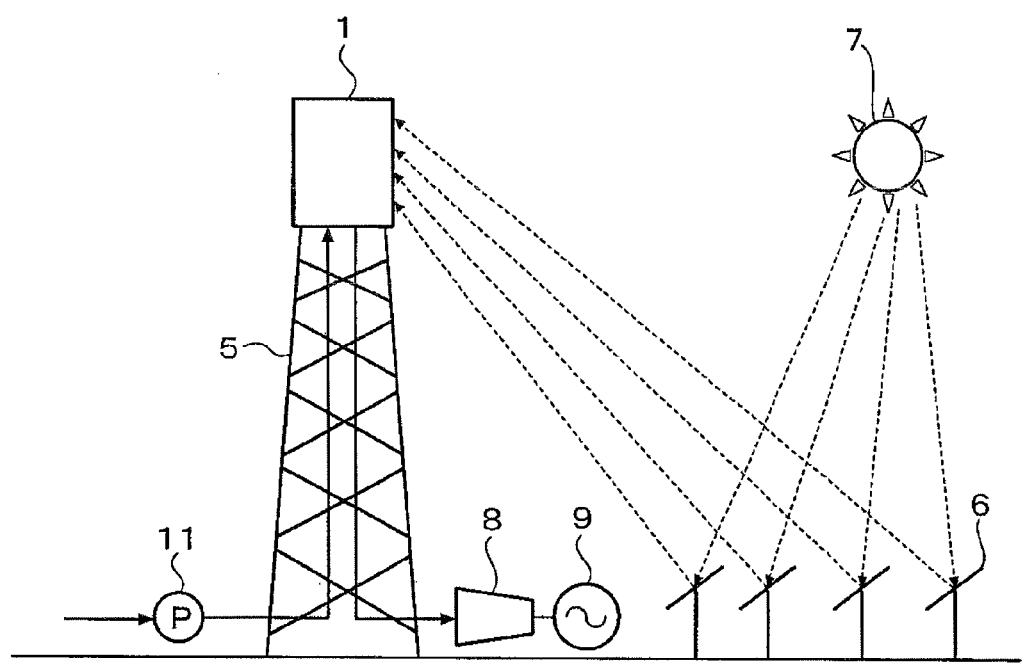
FIG. 17 A schematic configuration diagram of a solar heat boiler according to the background art.

An eighth embodiment of the invention is to solve the same problem as the problem the aforementioned seventh embodiment is to solve. FIG. 16 is a schematic configuration diagram of a solar heat integrated type electric power generation plant according to the eighth embodiment.

As shown in FIG. 16, a low-temperature heating device 51 and a solar collector 52 are formed separately, and a thermal fluid channel 53 is added to the solar collector 52. A thermal fluid circulating pump 55 is provided in the middle of the thermal fluid channel 53. A part of the thermal fluid channel 53 is disposed as a heat exchanger in the low-temperature heating device 51, which serves thus as a heat exchanger-including low-temperature heating device. A thermal fluid 54 is designed to circulate from the solar collector 52 into the thermal fluid channel 53.

Heat collected in the solar collector 52 is transferred to the low-temperature heating device 51 through the thermal fluid 54 circulating through the thermal fluid channel 53, so as to heat fluid consisting of water and steam in the low-temperature heating device 51.

The heat exchanger in the low-temperature heating device 51 (in this embodiment, a part of the thermal fluid channel 53) does not have to be limited especially as long as it is a noncontact type in which the thermal fluid 54 is not in direct touch with the fluid consisting of water and steam in the low-temperature heating device 51.

In the embodiment, a solar collector such as a Fresnel type or trough type solar collector in which a light collecting unit and a heat collecting unit can be placed in a low position close to the ground surface is preferable as the solar collector 52.

A thermal fluid whose phase does not change within an operating temperature range is used as the thermal fluid 54. The thermal fluid 54 circulates from the solar collector 52 into the thermal fluid channel 53 by the thermal fluid circulating pump 55. A chemical synthesis oil of diphenyl oxide, biphenyl, 1,1-diphenylethane, etc. alone or blended may be used as the thermal fluid 54.

The maximum operating temperature of the thermal fluid 54 represented above is about 400° C. Beyond the maximum operating temperature, remarkable deterioration or loss in performance may occur. It is therefore necessary to manage the temperature strictly. However, a thermal fluid thermometer 56 may be added to the thermal fluid channel 53 as shown in FIG. 16, in order to monitor the outlet thermal fluid temperature of the solar collector 52. When the temperature of the thermal fluid 54 is limited to be lower than the maximum operating temperature, for example, to be not higher than 300° C., it is not necessary to take special measures within the operation range.

In this manner, there is no fear that the phase of the thermal fluid 54 changes into a two-phase flow in the solar collector 52. Therefore, there is no fear that abnormality in heat transfer may occur due to an instant change in the amount of collected light or collected heat. Accordingly, there is no fear that thermal damage to the heat transfer tube may occur even under the condition of an uneven distribution of heat flux, but it is possible to improve the reliability and reduce the material cost.

The following configuration may be further provided.

As shown in FIG. 16, a thermal fluid thermometer 56 and a thermal fluid flowmeter 57 for measuring the temperature and flow rate of the thermal fluid 54 are provided on the outlet side of the solar collector 52, and measurement signals of the thermal fluid thermometer 56 and the thermal fluid flowmeter 57 are supplied to the arithmetic unit 26.

In the arithmetic unit 26, a control signal for controlling the opening degree of a water supply valve 20, that is, the flow rate of water supply is outputted to the water supply valve 20 so as to make the outlet side thermal fluid temperature of the low-temperature heating device 52 not higher than 300° C.

The reason why the outlet fluid temperature of the low-temperature heating device 52 is thus limited to 300° C. or less is similar to that in the aforementioned third embodiment, and redundant description thereof will be omitted. In addition, the other configuration is the same as that in each of the aforementioned embodiments, and redundant description thereof will be omitted likewise.

In the eighth embodiment, solar heat is used in the low-temperature heating device 51 for generating and heating steam indirectly through a thermal fluid heated by the solar collector 52 formed separately. In the high-temperature heating device 14, steam is heated directly by the solar heat collected in the same manner as in each of the aforementioned embodiments. The eighth embodiment may be referred to as a so-called hybrid heating type.

According to the eighth embodiment, the problem described in the beginning of the description of the seventh embodiment can be suppressed surely while suppressing and necessarily minimizing the configuration and scale of sections relating to a circulating system of the thermal fluid, such as the heat exchanger, the thermal fluid circulating pump 55, etc. which complicate the configuration of the boiler device. Thus, the eighth embodiment is effective.

Although a configuration for heating supplied water with a thermal fluid such as steam is used as the water supply heater 12 in each of the aforementioned embodiments, the water supply heater 12 may be also designed to heat the supplied water using the solar heat.

According to the invention, as described above, the low-temperature heating device and the steam-water separation device are placed on the ground surface or near the ground surface. A structure (for example, a supporting base) for supporting a heavy substance holding saturated water is not necessary, or the structure can be placed to be low enough to easily install and maintain the low-temperature heating device and the steam-water separation device. In addition, it is possible to simplify a structure by which the high-temperature heating device which holds only steam and is comparatively light in weight can be installed in a high site.

Further, when the low-temperature heating device and the high-temperature heating device are separated functionally and the steam-water separation device is placed therebetween, the risk of damage to the heat transfer tube can be reduced.

Furthermore, when the high-temperature heating device is installed in a high site, heat exchange can be performed with high thermal density, so that high-temperature steam can be obtained efficiently.

In addition, when the amount of extracted steam on the steam turbine side is adjusted in accordance with a fluctuation in the steam temperature or the steam flow rate when the amount of collected heat in the high-temperature heating device is controlled, the output of the steam turbine can be kept constant.

Although this embodiment has been described in the case of a solar heat integrated type electric power generation plant, the invention can be also applied to a solar heat stand-alone type electric power generation plant.

REFERENCE SIGNS LIST

4: steam-water separation device
6: heliostat
7: sun
8: steam turbine
9: electric power generator
10: boiler plant
11: water supply pump
12: water supply heater
13: low-temperature heating device
14: high-temperature heating device
15: circulating pump
16: tower
17: steam extraction valve
18: steam valve
21: superheater heat transfer tube
24: trough type low-temperature heating device
25: thermometer
26: arithmetic unit
27: heat transfer tube panel
28: flowmeter
30,35: reflecting mirror
31: heat transfer tube
32: light of the sun
33: water
34: two-phase flow of water and steam
37: circulating flow rate control valve
38: horizontal heat transfer tube
51: low-temperature heating device
52: solar collector
53: thermal fluid channel
54: thermal fluid
55: thermal fluid circulating pump
56: thermal fluid thermometer
57: thermal fluid flowmeter

The invention claimed is:

1. A solar heat boiler, comprising:
a low-temperature heating device including a heat transfer tube which is disposed horizontally so that water supplied from a water supply pump can circulate through the heat transfer tube, and a reflecting mirror which collects sunlight in the heat transfer tube, so that the low-temperature heating device can heat the water by heat of the sunlight;
a steam-water separation device by which two-phase fluid of water and steam generated in the low-temperature heating device is separated into water and steam;
a high-temperature heating device by which the steam separated by the steam-water separation device is superheated by heat of sunlight; and
a circulating pump by which the water separated by the steam-water separation device is supplied to the low-temperature heating device, wherein:
the low-temperature heating device, the steam-water separation device and the circulating pump are placed on or near a ground surface, and the high-temperature heating device is placed in a higher site than the low-temperature heating device and the steam-water separation device; and a water level gauge which measures a water level in the steam-water separation device, a water supply valve which adjusts a flow rate of water supplied to the low-temperature heating device, and a circulation flow rate control valve which adjusts the amount of water circulating between the low-temperature heating device and the steam-water separation device are provided so that the flow rate of the supplied water or the amount of the circulating water can be adjusted by the water supply valve or the circulation flow rate control valve with the water level in the steam-water separation device being set at a predetermined value which corresponds to a value to achieve annular or spray flow of the two-phase fluid of water and steam in the heat transfer tube.

2. A solar heat boiler according to claim 1, wherein:
a glass tube with a predetermined length is disposed on the periphery of the heat transfer tube with a predetermined length so as to form a double structure, and an airtight state or a vacuum state is kept between the heat transfer tube and the glass tube;
the heat transfer tube with the predetermined length is formed by a plurality of heat transfer tubes joined to each other by welding, and the glass tube with the predetermined length is formed by a plurality of glass tubes joined to each other through metal joint tubes which are disposed in joint portions between the glass tubes and which are welded with the glass tubes respectively; and
a temperature of the two-phase fluid at an outlet of the low-temperature heating device is regulated to 300° C. or less.

3. A solar heat boiler according to claim 2, wherein:
a thermometer and a flowmeter are placed in an outlet of the low-temperature heating device and a flow rate of water supplied to the low-temperature heating device is adjusted so that a temperature measured by the thermometer and a flow rate measured by the flowmeter can be set at predetermined values.

4. A solar heat boiler according to claim 2, wherein:
a thermometer and a flowmeter are placed in an outlet of the low-temperature heating device and an amount of collected heat in the low-temperature heating device is adjusted so that a temperature measured by the thermometer and a flow rate measured by the flowmeter can be set at predetermined values.

5. A solar heat boiler according to claim 1, wherein:
a thermometer and a flowmeter are placed in an outlet of the low-temperature heating device and an amount of collected heat in the high-temperature heating device is adjusted in accordance with a value of a temperature measured by the thermometer and a value of a flow rate measured by the flowmeter.

6. A solar heat boiler according to claim 1, wherein:
the circulating pump is placed on a channel through which the water is introduced from the steam-water separation device to the low-temperature heating device.

7. A solar heat electric power generation plant comprising:
heat boiler according to claim 1;
a steam turbine which is driven by steam generated by the solar heat boiler; and
an electric power generator which is driven by the steam turbine.

8. A solar heat electric power generation plant comprising:
a boiler which generates steam by burning fuel or generates steam by heat from a different fuel source;
a water supply pump which supplies water to the boiler;
a steam turbine which is driven by steam generated by the boiler;
an electric power generator which is driven by the steam turbine;
a water supply heater which heats the water supplied from the water supply pump using steam extracted from the steam turbine;
a low-temperature heating device including a heat transfer tube which is disposed horizontally so that water supplied from the water supply pump can circulate through the heat transfer tube, and a reflecting mirror which collects sunlight in the heat transfer tube, so that the low-temperature heating device can heat a part of the water by heat of the sunlight;
a steam-water separation device by which two-phase fluid of water and steam generated in the low-temperature heating device is separated into water and steam;
a high-temperature heating device by which the steam separated by the steam-water separation device is heated by heat of sunlight; and
a circulating pump by which the water separated by the steam-water separation device is supplied to the low-temperature heating device, wherein:
the low-temperature heating device, the steam-water separation device and the circulating pump are placed on or near a ground surface, and the high-temperature heating device is placed in a higher site than the low-temperature heating device and the steam-water separation device; and
a water level gauge which measures a water level in the steam-water separation device, a water supply valve which adjusts a flow rate of water supplied to the low-temperature heating device, and a circulation flow rate control valve which adjusts the amount of water circulating between the low-temperature heating device and the steam-water separation device are provided so that the flow rate of the supplied water or the amount of the circulating water can be adjusted by the water supply valve or the circulation flow rate control valve with the water level in the steam-water separation device being set at a predetermined value which corresponds to a value to achieve annular or spray flow of the two-phase fluid of water and steam in the heat transfer tube.

9. A solar heat electric power generation plant according to claim 8, wherein:
a glass tube with a predetermined length is disposed on the periphery of the heat transfer tube with a predetermined length so as to form a double structure, and an airtight state or a vacuum state is kept between the heat transfer tube and the glass tube;
the heat transfer tube with the predetermined length is formed by a plurality of heat transfer tubes joined to each other by welding, and the glass tube with the predetermined length is formed by a plurality of glass tubes joined to each other through metal joint tubes which are disposed in joint portions between the glass tubes and which are welded with the glass tubes respectively; and
outlet fluid temperature in the low-temperature heating device is regulated to 300° C. or less.

10. A solar heat electric power generation plant according to claim 9, wherein:
a thermometer and a flowmeter are placed in an outlet of the low-temperature heating device and a flow rate of water supplied to the low-temperature heating device is adjusted so that a temperature measured by the thermometer and a flow rate measured by the flowmeter can be set at predetermined values.

11. A solar heat electric power generation plant according to claim 9, wherein:
a thermometer and a flowmeter are placed in an outlet of the low-temperature heating device and the amount of collected heat in the low-temperature heating device is adjusted so that a temperature measured by the thermometer and a flow rate measured by the flowmeter can be set at predetermined values.

12. A solar heat electric power generation plant according to claim 8, wherein:
a thermometer and a flowmeter are placed in an outlet of the low-temperature heating device and the amount of collected heat in the high-temperature heating device is adjusted in accordance with a value of a temperature measured by the thermometer and a value of a flow rate measured by the flowmeter.

13. A solar heat electric power generation plant according to claim 8, wherein:
a steam extraction valve is provided on the outlet side of the steam turbine; and
the steam extraction valve is operated in accordance with the amount of steam supplied from the high-temperature heating device, so that a steam extraction flow in the steam turbine can be adjusted.

* * * * *